US008306874B2

(12) United States Patent
Morgenstern et al.

(10) Patent No.: US 8,306,874 B2
(45) Date of Patent: *Nov. 6, 2012

(54) METHOD AND APPARATUS FOR WORD OF MOUTH SELLING VIA A COMMUNICATIONS NETWORK

(75) Inventors: Jared Morgenstern, Newport Beach, CA (US); Edward Lim, Newport Beach, CA (US); Eoin Matthews, Aliso Viejo, CA (US)

(73) Assignee: Buy.Com, Inc., Aliso Viejo, CA (US)

( * ) Notice: Subject to any disclaimer, the term of this patent is extended or adjusted under 35 U.S.C. 154(b) by 0 days.

This patent is subject to a terminal disclaimer.

(21) Appl. No.: 11/112,483

(22) Filed: Apr. 21, 2005

(65) Prior Publication Data

US 2005/0234781 A1    Oct. 20, 2005

Related U.S. Application Data

(63) Continuation-in-part of application No. 10/997,121, filed on Nov. 24, 2004, and a continuation-in-part of application No. 11/044,544, filed on Jan. 26, 2005, now Pat. No. 8,032,555, and a continuation-in-part of application No. 11/045,164, filed on Jan. 27, 2005.

(60) Provisional application No. 60/525,905, filed on Nov. 26, 2003, provisional application No. 60/481,955, filed on Jan. 26, 2004, provisional application No. 60/481,957, filed on Jan. 27, 2004, provisional application No. 60/521,411, filed on Apr. 21, 2004.

(51) Int. Cl.
*G06Q 30/00* (2012.01)

(52) U.S. Cl. ............ 705/27.1; 705/26.1; 707/5; 707/10; 707/104.1; 707/201; 709/203; 709/204; 709/206

(58) Field of Classification Search ................. 705/1, 14, 705/26, 27, 39, 26.1, 27.1; 709/203, 204, 709/206; 707/5, 201, E17.067, E17.11, 104.1, 707/10

See application file for complete search history.

(56) References Cited

U.S. PATENT DOCUMENTS 5,774,869 A    6/1998  Toader
(Continued)

FOREIGN PATENT DOCUMENTS

JP    2003-281445    10/2003
(Continued)

OTHER PUBLICATIONS

Printouts of http://myspace.com/, (18 pages), printed on Feb. 23, 2005.
(Continued)

*Primary Examiner* — Yogesh C Garg
(74) *Attorney, Agent, or Firm* — Mitchell P. Brook; McKenna Long & Aldridge LLP

(57) ABSTRACT

A selling method and system that allows individuals or groups to interactively select associate products and services with their online presence in exchange for the online service, as part of an online service, or for some reward, monetary or otherwise. Individuals or groups select products and services from a pool of partner e-commerce retailers or import them from their purchasing histories based on personal preference and may use them as a means of expression for their online audience as part of an online service. This provides e-commerce retailers with self-selected targeted marketing and referral selling to affinity groups, the online version of word of mouth selling. E-commerce retailers share revenue and pay for referrals that occur via this word of mouth selling framework. Online services that have any form of user identity within the context of a larger audience may utilize this form of user based referral selling as a revenue generating tool.

20 Claims, 17 Drawing Sheets

U.S. PATENT DOCUMENTS

| | | | |
|---|---|---|---|
| 5,960,411 | A | 9/1999 | Hartman et al. |
| 5,991,740 | A | 11/1999 | Messer |
| 6,029,141 | A | 2/2000 | Bezos et al. |
| 6,049,777 | A | 4/2000 | Sheena et al. |
| 6,112,186 | A | 8/2000 | Bergh et al. |
| 6,175,831 | B1 | 1/2001 | Weinreich et al. |
| 6,266,649 | B1 | 7/2001 | Linden et al. |
| 6,269,369 | B1 | 7/2001 | Robertson |
| 6,301,607 | B2 | 10/2001 | Barraclough et al. |
| 6,334,127 | B1 | 12/2001 | Bieganski et al. |
| 6,438,579 | B1 | 8/2002 | Hosken |
| 6,457,005 | B1 | 9/2002 | Torrey |
| 6,539,392 | B1* | 3/2003 | Rebane ................... 705/7.31 |
| 6,578,072 | B2 | 6/2003 | Watanabe et al. |
| 6,636,836 | B1 | 10/2003 | Pyo |
| 6,782,370 | B1 | 8/2004 | Stack |
| 6,954,728 | B1 | 10/2005 | Kusumoto et al. |
| 6,961,467 | B2 | 11/2005 | Sirivara et al. |
| 6,963,848 | B1 | 11/2005 | Brinkerhoff |
| 6,968,313 | B1 | 11/2005 | Oran |
| 7,284,033 | B2* | 10/2007 | Jhanji ........................ 709/206 |
| 7,483,946 | B2* | 1/2009 | Boyd .......................... 709/204 |
| 7,664,669 | B1* | 2/2010 | Adams et al. ................. 705/10 |
| 7,774,229 | B1* | 8/2010 | Dernehl et al. ............ 705/14.16 |
| 2001/0020231 | A1 | 9/2001 | Perri, III et al. |
| 2001/0034644 | A1 | 10/2001 | Anavi et al. |
| 2001/0044745 | A1 | 11/2001 | Shaw |
| 2001/0053997 | A1* | 12/2001 | Bain ............................. 705/14 |
| 2002/0022996 | A1 | 2/2002 | Sanborn et al. |
| 2002/0026360 | A1 | 2/2002 | McGregor et al. |
| 2002/0103879 | A1 | 8/2002 | Mondragon |
| 2002/0111816 | A1* | 8/2002 | Lortscher et al. ............... 705/1 |
| 2002/0147625 | A1 | 10/2002 | Kolke, Jr. |
| 2002/0169851 | A1 | 11/2002 | Weathersby et al. |
| 2002/0174012 | A1 | 11/2002 | Litwin |
| 2002/0184307 | A1 | 12/2002 | Pineau |
| 2002/0188657 | A1 | 12/2002 | Traversat et al. |
| 2003/0046160 | A1 | 3/2003 | Paz-Pujalt et al. |
| 2003/0093329 | A1* | 5/2003 | Gutta ........................... 705/26 |
| 2003/0093493 | A1 | 5/2003 | Watanabe et al. |
| 2003/0174648 | A1 | 9/2003 | Wang et al. |
| 2003/0191816 | A1 | 10/2003 | Landress et al. |
| 2003/0225609 | A1 | 12/2003 | Klipfell, III |
| 2003/0234953 | A1 | 12/2003 | Dawson et al. |
| 2003/0236701 | A1 | 12/2003 | Rowney et al. |
| 2004/0032400 | A1 | 2/2004 | Freeman et al. |
| 2004/0044774 | A1 | 3/2004 | Mangalik et al. |
| 2004/0088369 | A1 | 5/2004 | Yeager et al. |
| 2004/0122918 | A1 | 6/2004 | Fredlund et al. |
| 2004/0148326 | A1 | 7/2004 | Nadgir et al. |
| 2004/0162878 | A1 | 8/2004 | Lewis et al. |
| 2004/0193673 | A1 | 9/2004 | Samji et al. |
| 2004/0225715 | A1 | 11/2004 | Gottfried |
| 2004/0230511 | A1 | 11/2004 | Kannan et al. |
| 2004/0236945 | A1 | 11/2004 | Risan et al. |
| 2004/0249846 | A1 | 12/2004 | Randall et al. |
| 2004/0267873 | A1 | 12/2004 | Shen et al. |
| 2005/0004837 | A1 | 1/2005 | Sweeney et al. |
| 2005/0004840 | A1 | 1/2005 | Wanninger |
| 2005/0027804 | A1 | 2/2005 | Cahill et al. |
| 2005/0076092 | A1 | 4/2005 | Chang et al. |
| 2005/0086062 | A1 | 4/2005 | Clark et al. |
| 2005/0091367 | A1 | 4/2005 | Pyhalammi et al. |
| 2005/0096982 | A1* | 5/2005 | Morton et al. .................. 705/14 |
| 2005/0097006 | A1 | 5/2005 | Nyako |
| 2005/0097173 | A1 | 5/2005 | Johns et al. |
| 2005/0102197 | A1 | 5/2005 | Page et al. |
| 2005/0108430 | A1 | 5/2005 | Howarth et al. |
| 2005/0114333 | A1 | 5/2005 | Nagano et al. |
| 2005/0144259 | A1 | 6/2005 | Buckley et al. |
| 2005/0154639 | A1 | 7/2005 | Zetmeir |
| 2005/0157330 | A1 | 7/2005 | Giuliano |
| 2005/0198493 | A1 | 9/2005 | Bartas |
| 2005/0210379 | A1 | 9/2005 | Weathersby et al. |
| 2005/0213147 | A1 | 9/2005 | Minatogawa |
| 2005/0216592 | A1 | 9/2005 | Miller et al. |
| 2005/0243381 | A1 | 11/2005 | Hill et al. |
| 2005/0251553 | A1 | 11/2005 | Gottfried |
| 2005/0251690 | A1 | 11/2005 | Kuno et al. |
| 2005/0254524 | A1 | 11/2005 | An |
| 2005/0273399 | A1 | 12/2005 | Soma et al. |
| 2005/0275870 | A1 | 12/2005 | Elarde et al. |
| 2005/0278758 | A1 | 12/2005 | Bodlaender |
| 2006/0004623 | A1 | 1/2006 | Jasti |

FOREIGN PATENT DOCUMENTS

| | | |
|---|---|---|
| WO | WO 96/24213 | 8/1996 |

OTHER PUBLICATIONS

Printouts of http://www.friendster.com/, (23 pages), printed on Feb. 23, 2005.

Printouts of http://multiply.com/, (19 pages), printed on Feb. 23, 2005.

Printouts of http://new.ryze.com/, (15 pages), printed on Feb. 23, 2005.

Printout of http://www.friendster.com/info/index.php?statpos=footer, printed on Feb. 23, 2005.

Printout of http://multiply.com/info/corp, printed on Feb. 23, 2005.

Printout of http://isp.2get2.net/cgi-mod/mi/welcome.cgi?nav=register_free&plan_abbr=free1&cb=6652, printed on Mar. 9, 2005.

Printout of http://www.surfwithus.net/rewards.cfm?promotioncode=googlefree, printed on Mar. 9, 2005.

Printout of http://netzero.net/, printed on Mar. 9, 2005.

Printout of http://web.archive.org/web/20000511043725/http://www.sixdegrees.com/, (printed on Jan. 3, 2005), illustrating web page as it may have appeared on May 11, 2000.

Printout of http://web.archive.org/web/19980521125430/http://sixdegrees.com/About/ (printed on Jan. 3, 2005), illustrating web page as it may have appeared on May 21, 1998.

Printout of http://web.archive.org/web/19980416103117/sixdegrees.com/About/BecomeAMember.cfm?PF=166181270631 (printed on Jan. 3, 2005), illustrating web page as it may have appeared on Apr. 16, 1998.

Printout of http://web.archive.org/web/19980521125824/sixdegrees.com/About/Faq.cfm (printed on Jan. 3, 2005), illustrating web page as it may have appeared on May 21, 1998.

* cited by examiner

FIG. 13

METHOD AND APPARATUS FOR WORD OF MOUTH SELLING VIA A COMMUNICATIONS NETWORK

CROSS REFERENCE TO RELATED APPLICATIONS

Priority is claimed to U.S. Provisional Patent Application Ser. No. 60/521,411, filed Apr. 21, 2004, the contents of which are incorporated herein by reference. This application is a continuation-in-part of the following applications: U.S. patent application Ser. No. 10/997,121, filed Nov. 24, 2004, which has priority to Provisional Application Ser. No. 60/525, 905, filed Nov. 26, 2003, U.S. patent application Ser. No. 11/044,544, filed Jan. 26, 2005, which has priority to Provisional Application Ser. No. 60/481,955, filed Jan. 26, 2004, and U.S. patent application Ser. No. 11/045,164, filed Jan. 27, 2005, which has priority to Provisional Application Ser. No. 60/481,957, filed Jan. 27, 2004, the contents of all of which are incorporated herein by reference.

BACKGROUND OF INVENTION

1. Field of the Invention

The present invention relates to a system and method of facilitating word of mouth selling via a communications network that enables consumers or groups to identify products and services that they have purchased or desire to purchase and include these products and services in an online profile that becomes visible to viewers.

2. Description of the Related Art

Internet selling has traditionally been done by online retailers selling products directly to purchasing individuals or groups. Amazon.com® is an example of an e-commerce website that specializes in selling a variety of products. U.S. Pat. No. 5,960,411 relates to a method and system for placing a purchase order via a communications network. Other e-commerce sites specialize in selling a particular type of product or service, such as the Apple® store or Dell.com® which both sell different varieties of computers and computer products. More recently, businesses have emerged that offer customers comparison shopping, enabling the customer to browse a variety of e-commerce sites for the best price or customer service when they are looking to purchase. MySimon.com® is an example of this. Google®'s Froogle® service is an example of a search engine that aggregates products from a variety of e-commerce sites and offers them in a single view to the potential customer.

These approaches are very different in their respective business models. In the first case, the online service provides the listing and handles the transaction. In the second case, the online service merely provides information, and may receive referral fees from the e-commerce site that completes the transaction. However, both of these approaches aim to achieve the same goal: to provide a potential buyer with a purchasing path that begins with the buyer's interest in a product or service. Along this purchasing path, the user may encounter product reviews or user feedback, which is, at best, the opinion of a stranger and, at worst, the contrived words of a biased party.

Also, an increasingly popular feature on online communities is the ability for a user to express his/herself using a variety of creative tools. For example, websites exist that allow users to create a virtual character, complete with clothes, accessories, and furniture. These sites are known collectively as avatar sites. A preferred embodiment of this invention would treat a user's previously purchased products and services and desired products and services as a means of self expression, and the web as just another place where we can express our individuality and conduct day-to-day social interaction.

One example of a known system is described in U.S. Pat. No. 6,175,831, which relates to a networking database containing a plurality of records for different individuals in which individuals are connected to one another in the database by defined relationships. This system, however, does not enable the individuals to provide word of mouth sales referrals by including marketing brands as part of the individual's identity in the database.

Another example of a known system is described in U.S. Pat. No. 6,269,369. U.S. Pat. No. 6,269,369, which relates to a network-computer-based personal contact manager system that enables users of networked clients to maintain and update user information that is stored in a relational database. The system allows each user to specify, on an individual basis, which contacts are permitted to access their user information. The system also allows users to find contacts based on common group affiliations and notifies users when there are coincidences in their data.

Additional descriptions of the background of the present invention may be found in the following books: "The Tipping Point: How Little Things Can Make a Difference" by Malcolm Gladwell, Back Bay Books (2002); and "Kellogg on Marketing" (Edited by Dawn Iacobucci), John Wiley & Sons (2000). Another reference related to the use of advertisements online and related pricing issues is described, for example, in connection with "GOOGLE®" AdWords.

One disadvantage of known systems is that a system of providing word of mouth types of sales referrals is not provided in which brands are marketed as part of the individual's identity.

One disadvantage of known systems is that they do not provide an automated mechanism where consumers or groups can represent themselves to their personal network via the products and services they own or want within a purchasing environment. Traditional e-commerce also suffers from the lack of relevant feedback from trusted sources.

Accordingly, there is a need for a system of word of mouth selling system that identifies brands with online identities and optionally tracks access and sales histories to provide rewards.

SUMMARY OF INVENTION

The present invention alleviates to a great extent the disadvantages of known advertising and content evaluation systems by providing an automated mechanism where brand owners can tap into a network of individuals or groups who are willing to represent their brands via their identities as part of a community.

The present invention optionally includes a system whereby e-commerce retailers can benefit from the word of mouth sales referrals of a willing and enthusiastic base of individual or group fans who have identified themselves as willing product or service advocates. It should be understood that the phrase "word of mouth" as used herein encompasses online communication where there is not necessarily an oral component such as uttered via talking, although optionally oral communication such as oral commands and input may be provided.

The present invention also optionally includes a method and system for aggregating and importing user purchasing history from multiple retailers within a word of mouth selling framework.

The present invention also optionally includes a method and system for providing incentives for users to purchase from their peers as well as for peers to import their purchasing histories and add their product and service desires to an online profile.

The present invention also optionally includes a method and system for syndicating word of mouth selling features and retailer networks to partner online communities as a way for them to increase their revenue.

According to one embodiment of the present invention, a method and system is provided that enables online word of mouth e-commerce whereby individuals or groups expressly decide the products and services that they wish to be associated with as part of their identity within an online community. They select and approve these products and services from their purchasing histories at various e-commerce retailers and can enrich this information with the products and services that they wish to purchase. Optionally, in return for adding their purchasing history to their profiles, individuals and groups receive rewards in the form of gift certificates when other users purchase the product or service that the individual or group advocated. Partner e-commerce retailers are asked to implement or expose a web service API that conforms to the specifications required for a user importing his or her purchasing history and for dynamically extracting referral links. Partners are also asked to expose a step in their e-commerce check out process that allows a user to add their purchase directly to their word of mouth selling profile. Partner retailers are also required to keep track of referral conversion rates and the dollar value of all referred sales. Alternatively, third party tools can be used to track conversion rates, etc.

In one embodiment, the system and method of the present invention provides a framework for achieving word of mouth selling on the Internet such that when a user views a product or service, he or she may associate it with the individual or group who has elected to include it as part of their online presence, even though that user may receive no direct monetary benefit for doing so. By providing individuals with products and services that allow them to express themselves in the context of a larger community, as well as the choice not to select products or services if they believe that none allow them to properly express themselves, a strong framework for word of mouth selling on the web can be created. This framework allows businesses to penetrate social groups where individuals have a higher probability of common interests. In one example, if ADIDAS® footwear is incorporated into a user's online presence, and a friend notices this, it can have more value than if he or she saw the ADIDAS® footwear advertised on CNN® or even on an ADIDAS® e-commerce site.

Users may browse profiles to obtain word of mouth referrals of products or services. Additionally, users may select to purchase the products or services identified in the profiles. If a user selects to purchase a product or service identified in a profile, the user whose profile identifies the product or service may receive a reward. The reward may be a commission from the sale, a discount for a future purchase or any other type of monetary or non-monetary reward. A service provider may have an agreement with individuals or groups of individuals that advocate products and services in exchange for a service, as part of an online service, or for some reward, monetary or otherwise. The service provider may also have an agreement with e-commerce retailers to share revenue with the service provider for this type of referral based selling. This touches on the field of online communities and social networking, as these are the areas where such a selling campaign would be most successful because of the value of the association of a product or service with the advocating individual or group combined with the credibility an individual or group is likely to receive as a member of such a community.

BRIEF DESCRIPTION OF DRAWINGS

These and other features of the invention, its nature, and various advantages will be appreciated from the accompanying drawings, and the following detailed description, in which like reference numbers represent like parts throughout:

FIG. 13 is an illustration of an example viewer client display from a third party partner e-commerce site that demonstrates a way of allowing users to incorporate their purchasing histories to a word of mouth selling system.

DETAILED DESCRIPTION

In the following paragraphs, the present invention will be described in detail by way of example with reference to the accompanying drawings. Throughout this description, the preferred embodiments and examples shown should be considered as exemplars, rather than as limitations on the present invention. It will be apparent that the invention can be embodied in a wide variety of forms, some of which may be quite different from those of the disclosed embodiments. Consequently, the specific structural and functional details disclosed herein are merely representative and do not limit the scope of the invention. As used herein, the "present invention" refers to any one of the embodiments of the invention described herein, and any equivalents. Furthermore, reference to various aspects of the invention throughout this document does not mean that all claimed embodiments or methods must include the referenced aspects.

Figure 1:
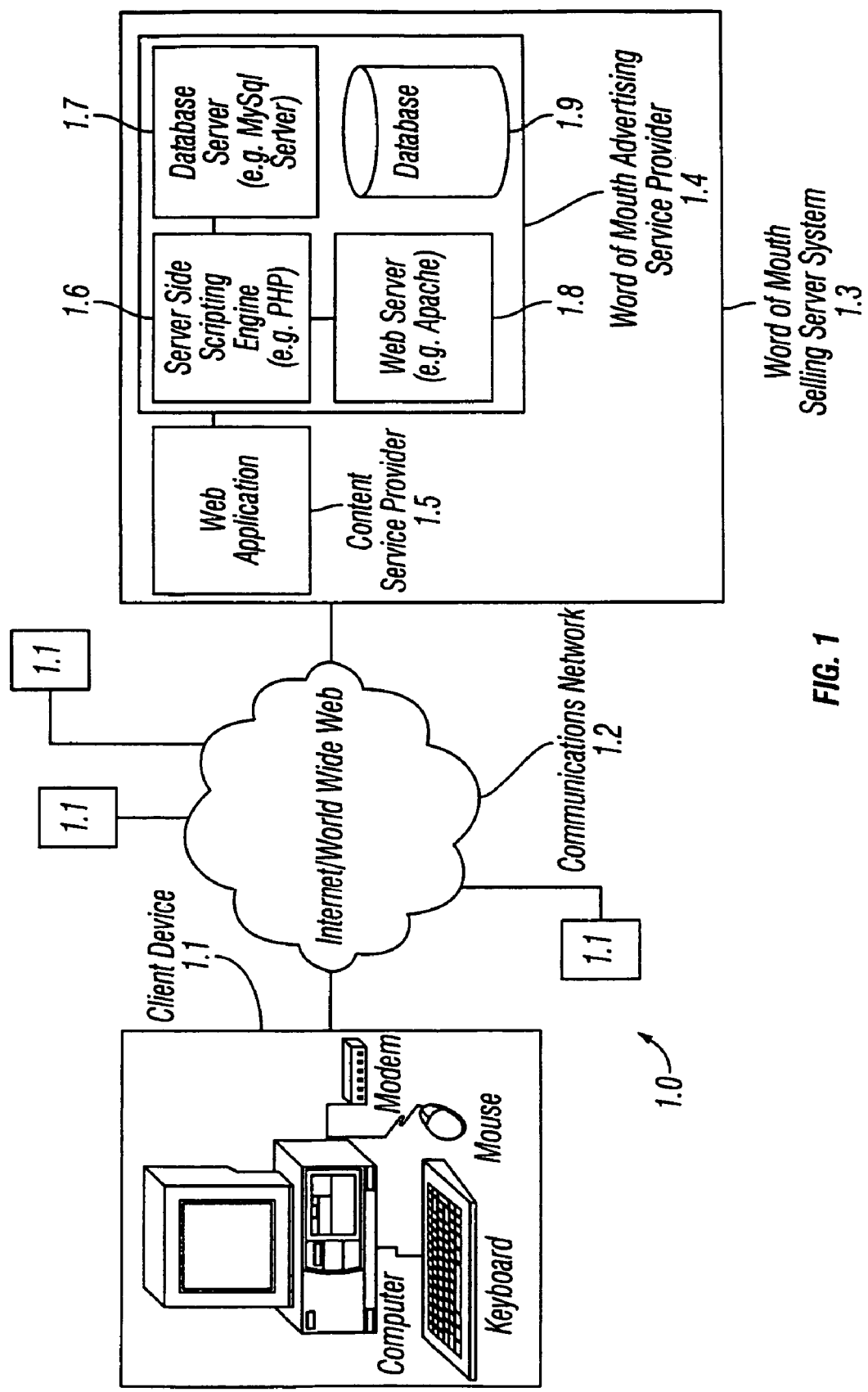
FIG. 1 is a block diagram of a word of mouth selling system via a communications network (WMSSVCN) in accordance with a preferred embodiment of the present invention.

Referring to FIG. 1, there is generally shown a word of mouth selling system via a communications network (WMSSVCN 1.0) in accordance with the present invention. The WMSSVCN 1.0 includes a plurality of client devices 1.1, each of which is coupled to a network 1.2, and, in turn, to a word of mouth selling system (WMSS) 1.3. Each client device 1.1, of which one is shown in some detail and three others are represented in block form, is typically a personal computer, such as a Windows-based personal computer. It should be understood that client devices may also be laptops, PDA's, workstations, mobile phones, Internet enabled TV, or the like. Each client device 1.1 has an input device such as a keyboard and/or mouse and a display for communication with a user. The client device has communications software and a modem (or some other form of Internet connectivity, such as a digital subscriber line (DSL) modem, cable modem, T-1 line, integrated services digital network (ISDN) line, or the like). Communications software may be any software suitable for telecommunications, and is preferably browser software. The communications software is for communication over network 1.2 with a WMSS 1.3. Network 1.2 may be, for example, the Internet.

The WMSS 1.3 includes a Word of Mouth Selling Service Provider (WMSSP) 1.4. and a Content Service Provider (CSP) 1.5 connected by a communication channel (i.e. the Internet). The CSP 1.5 is preferably a web application that displays contents authored by agents, where agents are individuals or groups, and an agent can also be a user or client as defined herein. The CSP 1.5 and the WMSSP 1.4 may be a wholly integrated web application such as a web log and social networking web site that allows users to decorate themselves with products and services from their purchasing history and that shares the same web server, database provider, and server side scripts. It should also be understood that the CSP 1.5 may be a third party subscriber to the WMSSP 1.4 or vice versa. Examples of third party web applications that could serve as content service providers are web log systems such as Blogger, social networking systems such as Friendster, instant messaging systems such as AOL Instant Messenger, and community oriented applications such as Ebay users, provided these services are modified to interface with the WMSSP 1.4.

The WMSSP 1.4 typically includes a web server, which is characteristically a programmed computer, preferably one which supports a HyperText Transfer Protocol (HTTP), that handles document requests and provides other services, returning information to the requestor. It should be understood that the web server may communicate by exposing web services which communicate XML, or the like. It should be clear that the web server could be replaced by an application that functions as a server, such as a program that listens to a specific port for incoming request. Many suitable software programs for the web server exist, including Apache and Microsoft® Internet Information Services (IIS). WMSSP 1.4, in addition to a web server 1.8, includes a server side scripting engine 1.6, preferably PHP, available from php.net, connected to the web server 1.8 for pre-processing an output from the web server before it is returned via the communications network 1.2. The server side scripting engine 1.6 also allows communication with a database server 1.7, preferably Mysql, available from mysql.com, using the Open Database Connectivity (ODBC) protocol. Other similar server side scripting products could be used, such as Cold Fusion, ASP.NET technology. The database server 1.7 is generally configured as an SQL database, and, besides Mysql, other database systems could be used such as those available from Oracle, Informix, Microsoft®, or Sybase. The WMSSP 1.4 may also be a multi-server system, such as a web farm. The database server 1.7 is in communication with a database 1.9 in which the database server 1.7 stores content.

Figure 2:
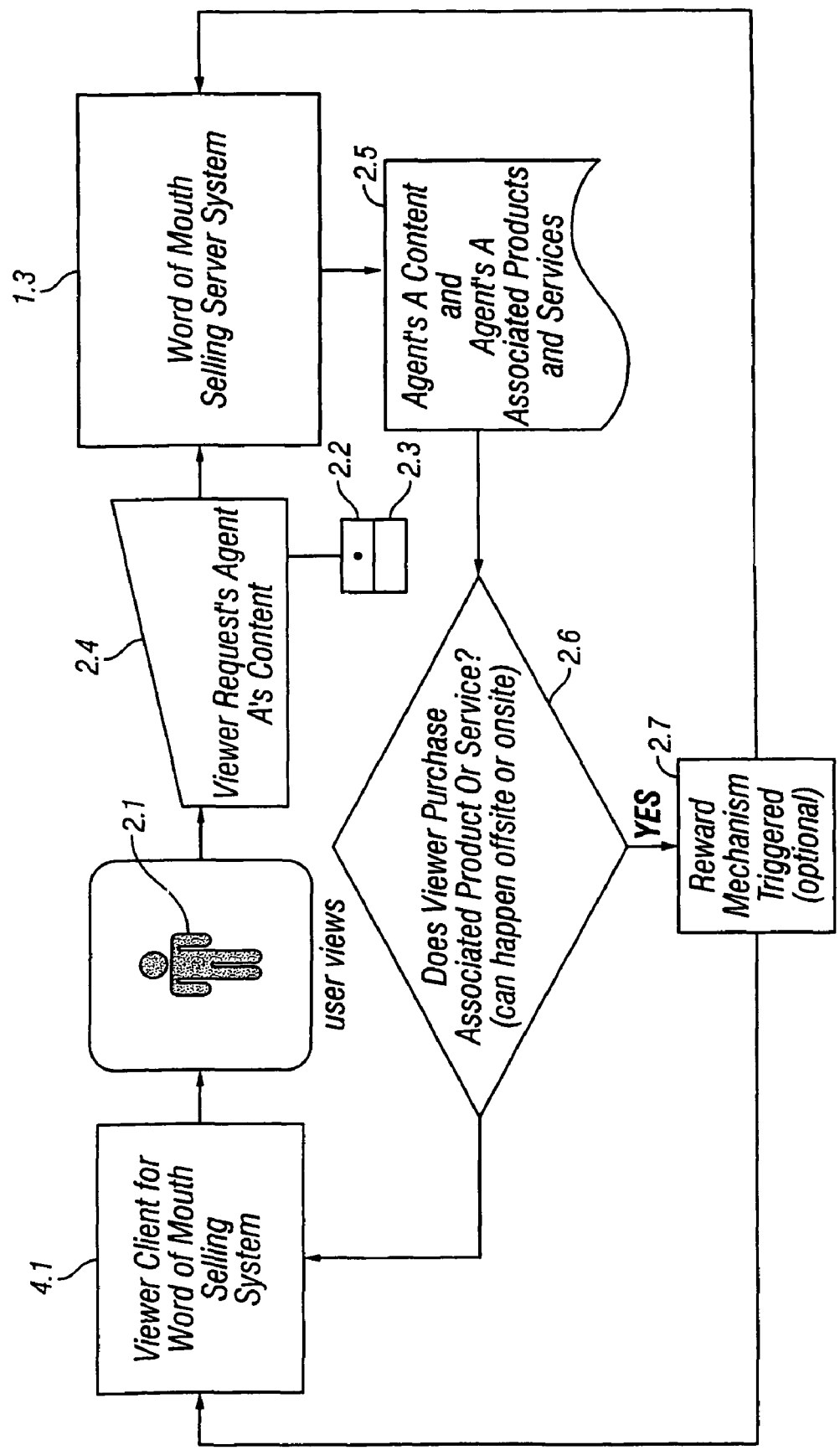
FIG. 2 is a flow chart depicting the high level functionality of a word of mouth selling system (WMSS) via a communications network.

Referring to FIG. 2, there is generally shown the high level flow by which a viewer 2.1 (also called a user or client) may view and purchase a word of mouth recommended product or service from a WMSSS 1.3 (Word of Mouth Selling Server System). It should be noted that "viewer" as used herein is a "user" who is viewing another user's content, such as via a client device 1.1. At other times or simultaneously a "viewer" can be making his/her own content available to viewing by other viewers. A preferred example of this flow involves a user 2.1 viewing content in a web browser, the web browser acting as the Viewer Client for Word of Mouth Selling System 4.1, which displays a set of friends of a particular user and an option to view their associated web logs, for example. If the user clicks to view the web log of an Agent A, a request for Agent A's content is sent to the WMSS 1.3, as illustrated with reference number 2.4. An agent or group of agents is illustrated diagrammatically with reference number 2.2 for purposes of illustration of the agent(s) and groups of agents discussed herein and content associated with the agent(s) is illustrated diagrammatically with reference number 2.3 for purposes of illustration of the content associated with an agent(s) as discussed herein. The WMSS 1.3 processes the request, first receiving it from the web server, processing the appropriate PHP, accessing the Mysql database when necessary, and returning a document 2.5, preferably HTML, containing the requested content and products and services associated with the agent, for rendering by the client system, in this case, a browser.

The rendering includes links to purchase the associated product and services which, if clicked, communicate with the WMSS 4.1 to either begin purchasing the product on the WMSS 4.1 servers or to be redirected to a third party partner to complete the transaction, as illustrated with reference number 2.6. Upon completion of the transaction in either case, the WMSS 4.1 is informed and may trigger a reward mechanism to reward the referring individual, as illustrated with reference number 2.7.

Figure 4:
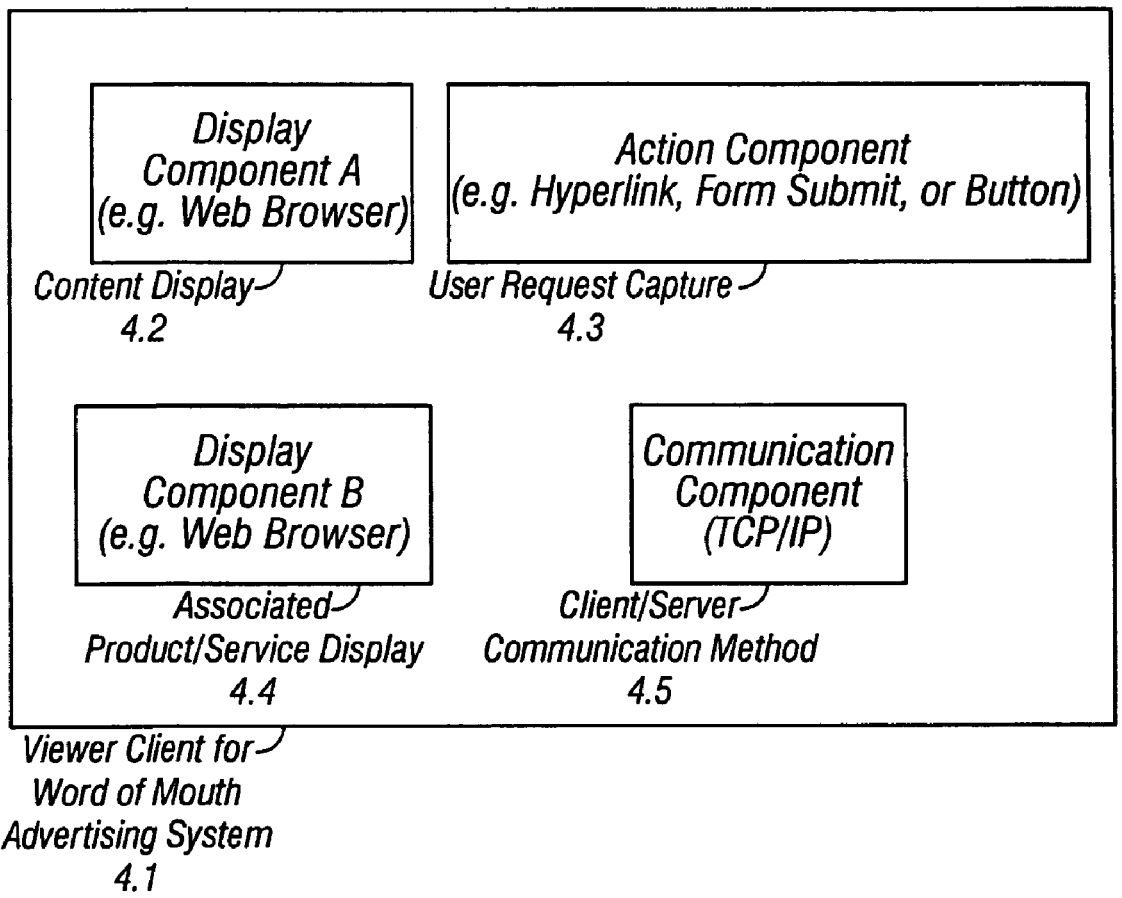
FIG. 4 is a block diagram of a viewer client for a WMSS.

FIG. 4 depicts the typical components required for a Viewer Client for a Word of Mouth Selling System (VCWMSS) 4.1. There are displays for two types of information, content 4.2 and products/services 4.4. It should be apparent that these two types of displays may be rendered by the client 4.1 in the same display, as a web browser does; however, they may be in separate windows in a client application that separates advertisement display from content display, such as Kazaa Media Desktop, AOL Instant Messenger, or the iTunes Software Application. An action component 4.3 may be activated by the viewer 4.1 to indicate a desire for an agent's content (the viewer 4.1 requests an agent's content as illustrated with reference number 2.4 in FIG. 2). This is typically the method that a web browser supports for interaction, such as keyboard input, mouse input, or the like, but extends to other methods of interaction such as the utterance of a sound or the touching of a screen or the sending of an e-mail. Finally the VCWMSS 4.1 requires a method for communication with a server system 4.5, typically this is TCP/IP used by the web browser.

Figure 3:
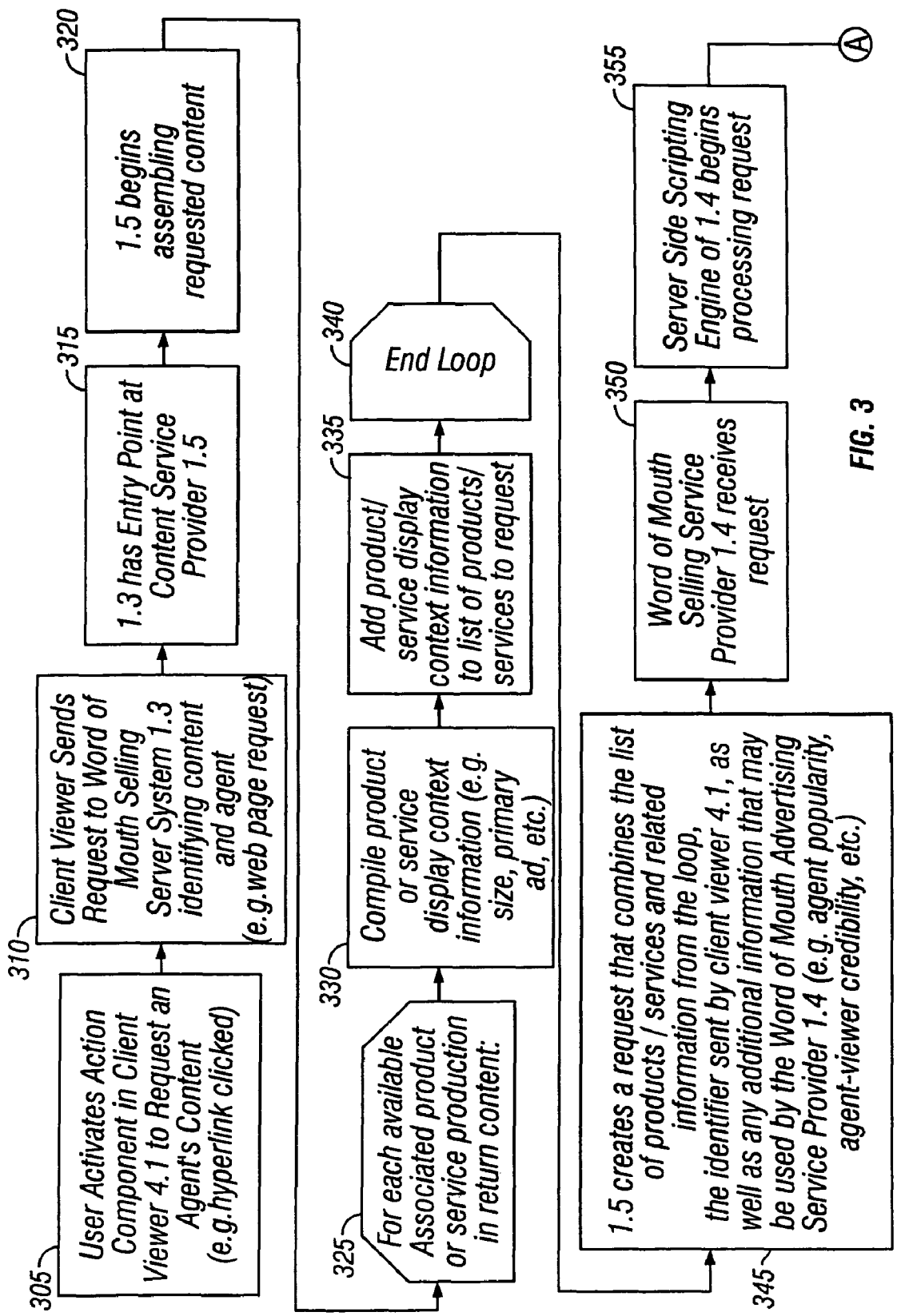
FIG. 3 is a flow chart showing the client-server functionality from when content is requested to when content and associated products and services are returned as in FIG. 2.
Figure 3:
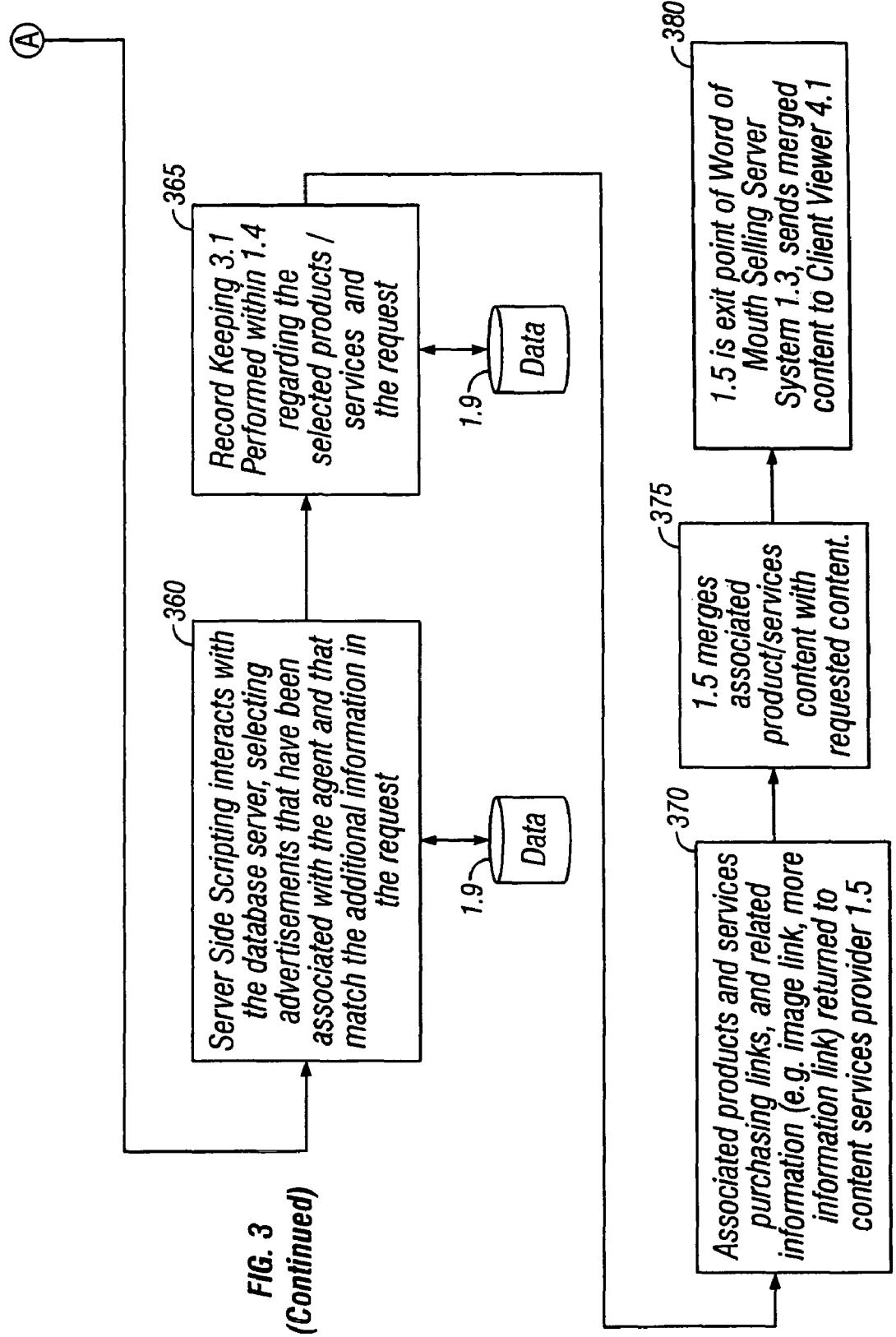
Figure 3:
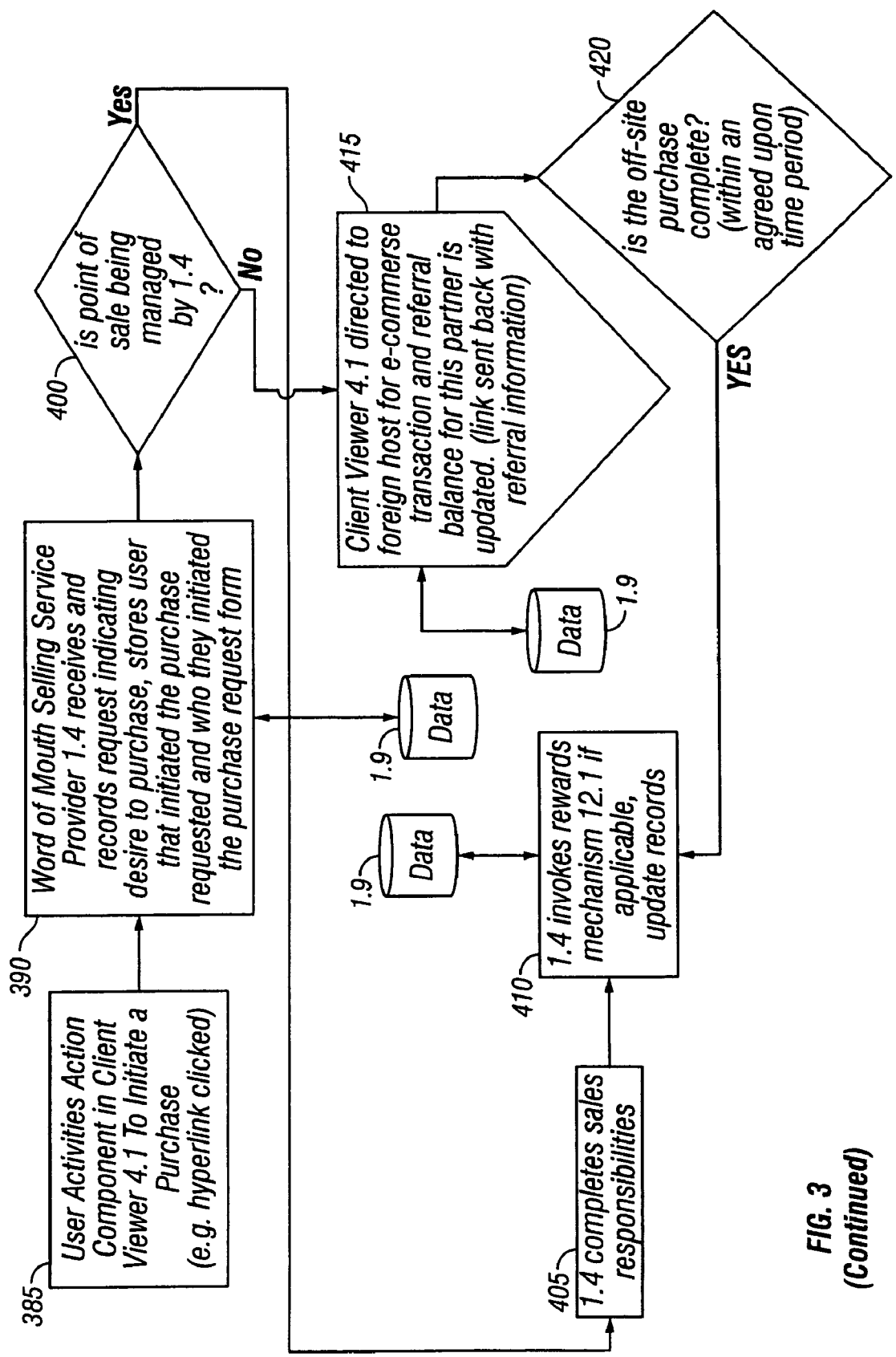

Referring to FIG. 3, an example process for providing word of mouth selling between a client 1.1 and server system 1.3 is shown in more technical detail. First, a viewing user 2.1 activates a component in a VCWMSS 4.1 that indicates a request for an agent's content (305) (note: for the remainder of the present disclosure herein, an agent may be an individual or a group as illustrated with reference number 310 in FIG. 3 and similarly with reference number 2.4 in FIG. 2). This action is typically the clicking of a hyperlink in a browser, but may be the selection of an icon using web TV or, the accessing of an individual's music collection in a networked file sharing client via a touch screen system, the accessing of a group's store on an e-commerce site via form submission, or the sending of an email to a server with instructions that enable the server to automatically return content, or the like.

The client 1.1 or 4.1 has an associated identifier that represents the content that is being requested as well as the agent 2.2 that the content 2.3 is associated with. In a preferred example, this identifier takes the form of two identifiers, a content identifier 2.3 and an agent identifier 2.2, that was delivered to the web browser via the returned HTML that the client rendered as a currently displayed page and is embedded into the link that indicates content by a user. For example, to access Jon's (a hypothetical user's) web log, the link may encode the URL to visit Jon's web log.

Figure 5:
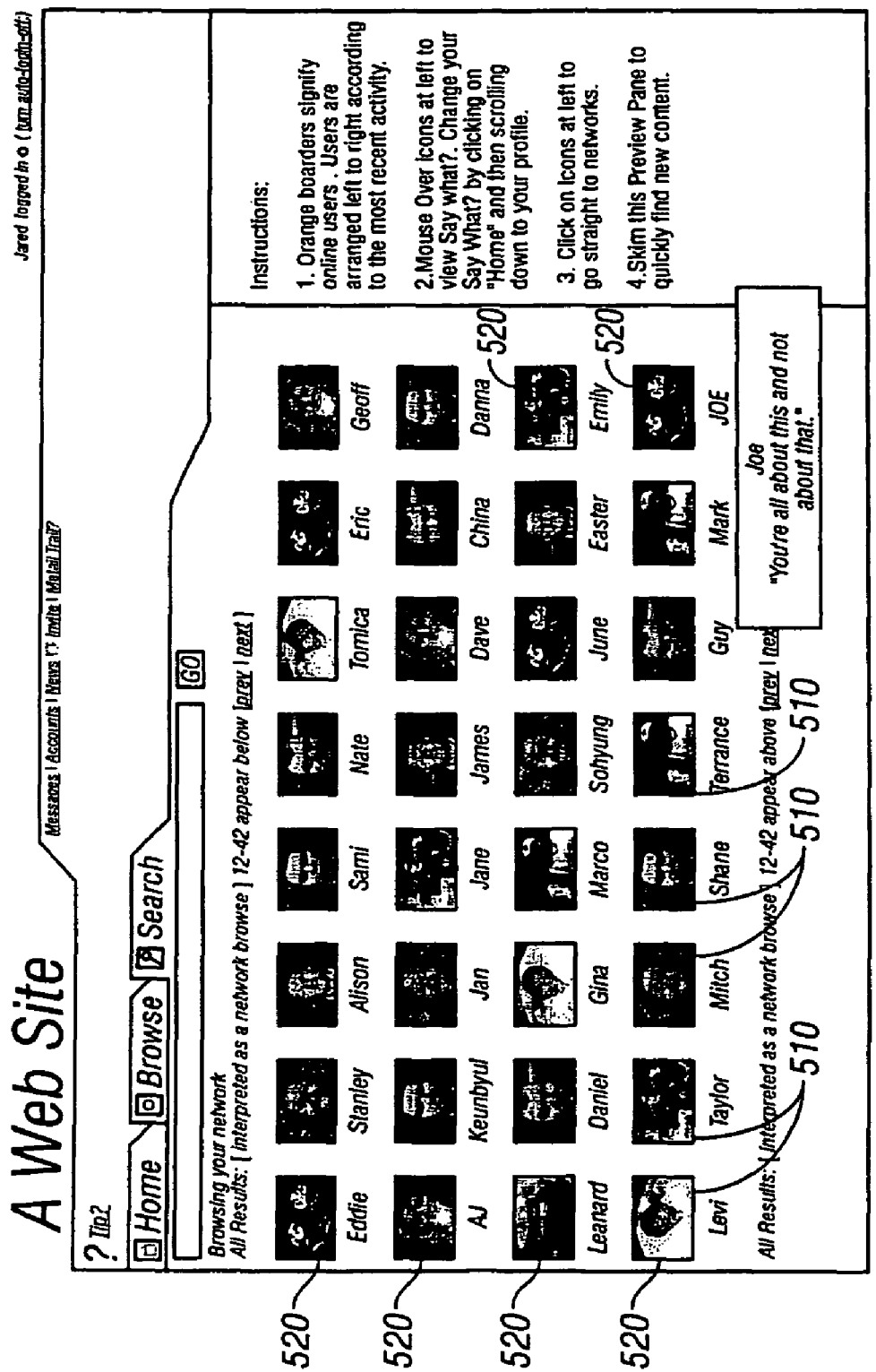
FIG. 5 is an illustration of an example viewer client display prior to invoking the functionality of FIG. 3.

As illustrated in FIG. 3, the Client Viewer 4.1 sends a request to the WMAS 1.3 identifying desired content and agent, such as in the exemplary web page request (illustrated with reference number 310). Other possible identifiers include email addresses, logins, as well as codes that represent both the content and the agent (which must be decoupled at the server) or codes that have one content and agent identifier for the CSP 1.5 and another content and agent identifier for the WMSSP 1.4, or the like. It should be clear that the request identifying the content and agent may contain additional information that is required by the server, such as login information, or the like. FIG. 5 shows a client display for accessing an agent's content. In FIG. 5, a user can indicate a request if the user selects one of the hyperlinks 510 associated with a person's picture or on the picture itself 520. For the sake of clarity and appearance, some of the hyperlinks 510 and pictures 520 are not labeled with a corresponding reference number in FIG. 5, however, it is to be understood that each picture and each name associated with a picture may be used to access an agent's content.

The WMSSS 1.3, which includes a CSP 1.5 and a WMSSP 1.4 typically has the CSP 1.5 as the starting point for the processing of the request 315. In a preferred example, the CSP 1.5 and the WMSSP 1.4 are run on the same server as part of single application, and inter-server communications are not required. When the web server of CSP 1.5 receives the client request in the form of a GET document request and parameters, it runs the PHP server side engine on the document requested and the parameters get passed to the PHP engine (for the remainder of the present document herein, when PHP is referenced, it is either called by the web server using a GET or POST command).

The step of commencing assembling of the requested content is illustrated with reference number 320 and other steps of the process are illustrated with numbers 325, 330, 335 and 340. Although these steps are discussed as a script, any process control can be applied that will generate the desired output information back to the client device 1.1. In an example, the script begins assembling content 320, in this example, Jon's web log by accessing the data associated with Jon's web log in the database system. The programmed script begins to run, creating the output HTML that will ultimately be sent to the client. When an associated product/service is to be rendered, the script appends information regarding this instance to a product/service variable. Instance information could include the size of the space (300×600 pixels), the positioning of the products/services (top, left, right), the importance of the positioning (primary, secondary), or the like.

After all the products/services have been appended to the list (such as via the steps illustrated with numbers 320 through 340), as illustrated in box 345, the CSP 1.5 creates a request that combines the list of advertisements and related information from the processing loop (such as steps 325, 330, 335, 340), the identifier (such as discussed above) sent by client viewer 4.1, as well as any additional information that may be desired to be used by the WMSSP 1.4 (for example agent popularity, agent-viewer credibility, etc.). The WMSSP 1.4 receives the request 350 and begins processing 355 whereby it is called upon with this list as well as the agent identifier to select the associated products/services (in this example, this requires only a PHP function call). As illustrated with reference number 360, server side scripting such as in the WMSSP 1.4 interacts with the database server that access database 1.9, selecting products and services that have been associated with the agent and that match the additional information in the request.

In a preferred application, the viewer 4.1 would be logged into the system (i.e. using a cookie/server login authentication scheme) so that the server is aware of his/her identity and may be able to deduce a relationship of the viewer to the agent (i.e. using a networking database) so that these parameters may be passed to the WMSSP 1.4 and word of mouth impression record keeping can be performed. A record keeping module and procedure is illustrated with reference number 3.1 in the box labeled 365. Additional information may also be passed to the WMSSP 1.4, such as the content being requested and the viewer accessing the content.

The WMSSP 1.4 uses the information it receives to return products/services in a display size/form that match the criteria of the CSP 1.5 as illustrated by way of example with reference numbers 345 through 380. In order to do this, PHP 1.6 interfaces with the Mysql database 1.7 by making SQL queries to locate appropriate data. In a preferred example, PHP 1.6 constructs a query that selects all product/service identifiers associated with the agent from a database table that has previously been populated with rows of product/service identifiers and agent identifiers, where a row grouping a product/service identifier and an agent identifier indicates that the agent has expressly elected to be associated with that item. PHP 1.6 can then run additional, more restrictive queries on this set of product/service identifiers by looking them up in an display form table that lists other features such as size, or the like. If required, the WMSSP 1.4 may even call external web services to get up-to-date retailer information about the product. The CSP 1.5 retrieves the package of associated products/services information and merges it with the requested content before sending it back to the client 4.1 as HTML. The web browser client then renders the returned HTML as illustrated in the illustrated portion of the examples with reference numbers 375 and 380. The web browser client then renders the returned HTML.

According to a further embodiment of the present invention, a viewing user 2.1 activates a component in a VCWMSS 4.1 that indicates a request for purchasing associated products or services as illustrated diagrammatically as reference number 385. The WMSSP 1.4 receives and records the request indicating the viewer's desire to purchase the associated products or services as illustrated with reference number 390. The WMSSP 1.4 stores information regarding the user that initiated the purchase request and from whom the purchase was initiated. The WMSSP may access a database 1.9 when recording the request and storing the user information.

A determination is then made regarding whether a point of sale is being managed by the WMSSP 1.4 as illustrated diagrammatically with reference number 400. If a determination is made that the WMSSP 1.4 is managing the point of sale, the WMSSP 1.4 completes the sales responsibilities as illustrated with reference number 405. The WMSSP 1.4 may then invoke a reward mechanism, if applicable, and update any corresponding records as illustrated with reference number 410. The WMSSP 1.4 may access a database 1.9 as necessary.

If a determination is made that the point of sale is not being managed by the WMSSP 1.4, the client viewer 4.1 may be directed to a foreign host for e-commerce where transaction and referral balance information for this partner is updated, as illustrated diagrammatically with reference number 415. A link may be sent back to the WMSSP 1.4 with referral information. The information may be used to update records stored in a database 1.9.

A determination is then made regarding whether the off-site purchase has been completed as illustrated with reference number 420. If the purchase is complete, the reward mechanism described with reference number 410 may be invoked.

Figure 6:
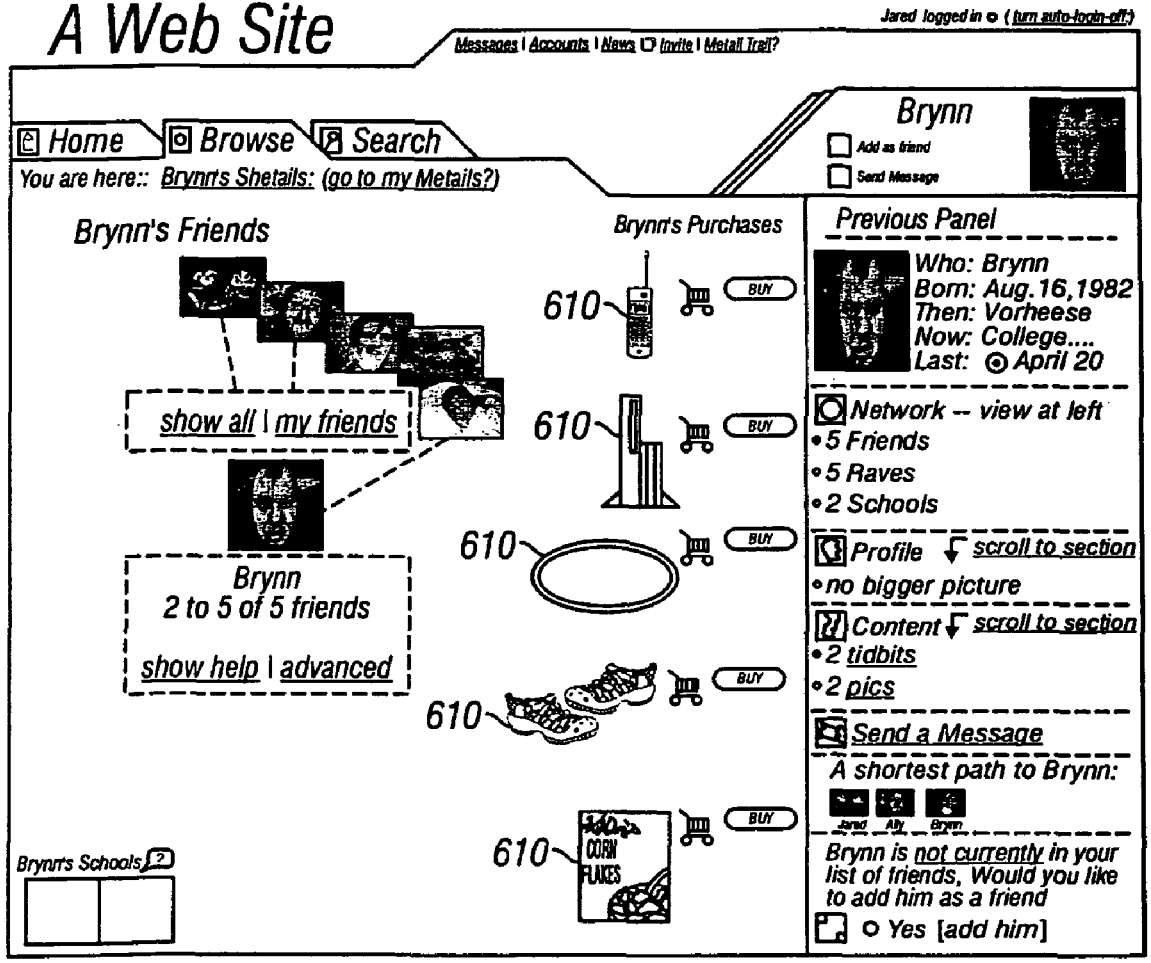
FIG. 6 is an illustration of an example viewer client display after invoking the functionality of FIG. 3.

FIG. 6 provides an illustration of the merged content. As shown, the associated products/services 610 appear on the page and are clearly identified as endorsed or purchased by the agent by words or symbols which can, if desired, be colloquial, such as "brands I dig". This is not required, but a statement of brand loyalty enhances the message that the agent is advocating these products/services.

Figure 7:
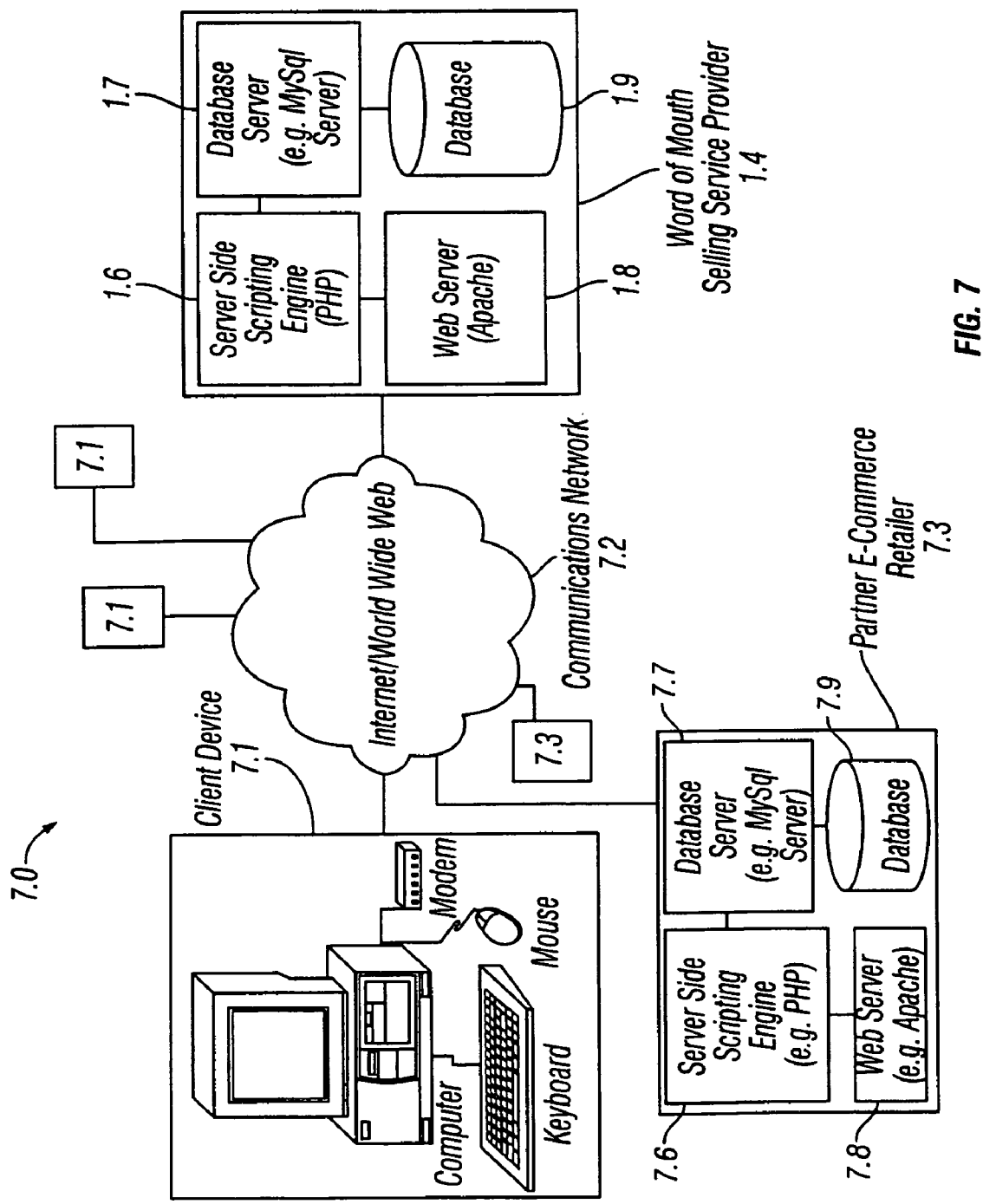
FIG. 7 is a block diagram of an product or service association system (PSAS) for having agents associate the products or services that they will be associated with in the WMSS.

Referring to FIG. 7, there is generally shown a product/service association system via a communications network (PSASVCN 7.0) in accordance with the present invention. The PSASVCN 7.0 includes a plurality of client devices 7.1, each of which is coupled to a network 7.2, and, in turn, to a Word of Mouth Selling Service Provider (WMSSP) 1.4. Each client device 7.1, of which one is shown in some detail and three others are represented in block form, is typically a personal computer, such as a Windows-based personal computer. It should be understood that client devices may also be laptops, PDA's, workstations, mobile phones, Internet enabled TV, or the like. Each client device 7.1 has an input device such as a keyboard and/or mouse and a display for communication with a user. The client device 7.1 has communications software and a modem (or some other form of Internet connectivity, such as a DSL modem, cable modem, T-1 line, ISDN line, or the like). Communications software may be any software suitable for telecommunications, and is preferably browser software.

The communications software is for communication over network 7.2 with a WMSSP 1.4. Network 7.2 may be, for example, the Internet. Note that this diagram differs from FIG. 1 in that it does not require a CSP 1.5 for delivering content. Also take notice that the Client Devices 7.1 and the Communications Network 7.2 are labeled differently than in FIG. 1, this is used to indicate that they may be different from the items listed in FIG. 1; however, the preferred embodiment uses the same client devices (web browsers) in both the PSASVCN 7.0 and the WMSSVCN 1.0. The WMSSP 1.4 refers to the same object in both the PSASVCN 7.0 and the WMSSVCN 1.0. The PSASVCN 7.0 includes a plurality of partner e-commerce retailers 7.3, each of which is coupled to a network 7.2, and, in turn, to a Word of Mouth Selling Service Provider (WMSSP) 1.4. Each partner retailer 7.3, of which one is shown in some detail and one other is represented in block form, is typically a server system housing an e-commerce site. FIGS. 7, 8, 9, and 10 illustrate how the WMSSP 1.4 populates its storage device with the advertisements that are associated with agents. The partner e-commerce retailer 7.3 may include a server side scripting engine 7.6 (e.g., a PHP), a database server (e.g., MySql server), a web server (e.g., an Apache server), and a database 1.9 as described in further detail above.

Figure 8:
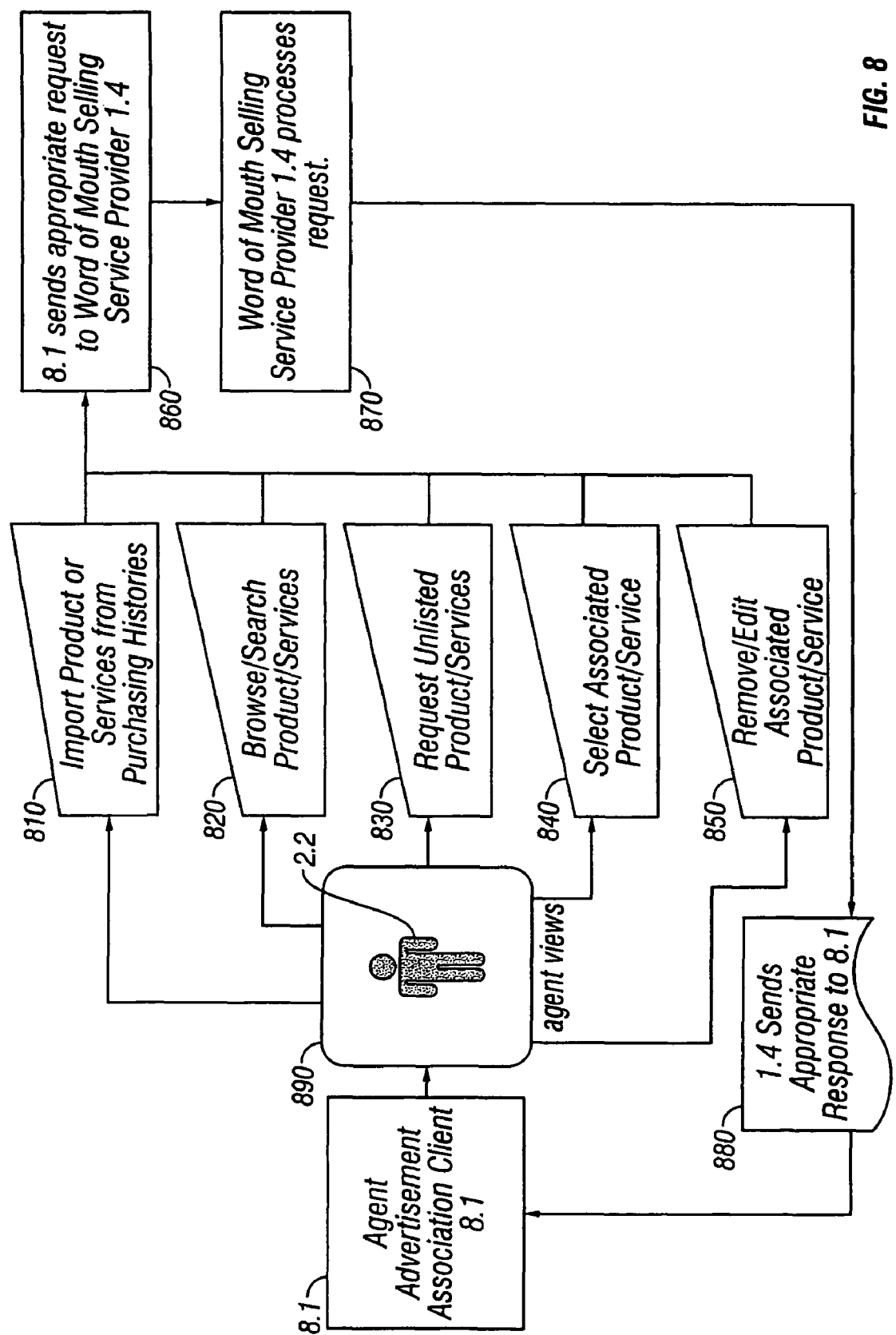
FIG. 8 is a flow chart depicting the high level functionality of the PSAS.

Referring to FIG. 8, there is generally shown the high level flow by which agents 2.2 may associate products/services with themselves in the PSASVCN 7.0. A preferred example of this flow involves an agent 2.2 viewing content in a web browser, the web browser acting as the Agent Product/Service Association Client (APSAC) 8.1, which is used as the interface between the agent and the WMSSP 1.4 which returns to the browser HTML documents that provide the agent with a number of separate services, depending on how the agent interacts with them. Typically, an agent is logged in to the system, with the WMSSP 1.4 maintaining the logged in session of the agent during this interaction. There are a number of known techniques for maintaining session state. Typically, an agent is logged in to the system, with the WMSSP 1.4 such as for example via the illustrated client system 7.1, the APSAC 8.1 operated on the system 7.1. There are a number of known techniques for maintaining session state, such as ASP's session object, Netscape's Cookie technology, or the maintenance of extra parameters in HTML, and these will not be discussed further as they are known in the art and any technique for maintaining a session state can be used but these are not be discussed because they are not within the scope of the invention.

Because the agent 2.2 is logged in to the system, the system can identify the agent with a unique identifier, such as an agentID, that is stored in the Mysql database system on the WMSSP 1.4 and may be assigned separately, for example during a sign-up procedure. The PSASVCN generally provides the agent with a number of capabilities illustrated by way of example in FIG. 8, such as the ability to import products/services 810 from their purchasing history from a pool of participating e-commerce retailers and subsequently select them for association, to browse or search for desired products/services 820 from the pool of participating e-commerce retailers or from the products/services offered by the WMSSP 1.4 directly, to request unavailable products/services 830 (so that the WMSSP 1.4 can try to add this product/service (840) and its retailer to the pool), and to remove or edit the product/services (850) for which they have associated themselves.

As described in FIG. 8, the ASPAC 8.1 sends the appropriate request to the WMSSP 1.4 (reference number 860), the WMSSP 1.4 processes the request 870 and sends the appropriate response to the ASPAC 8.1 (reference number 880). The agent 2.2 operates the ASPAC 8.1 as illustrated diagrammatically with box 890 and the text "agent views".

Figure 10:
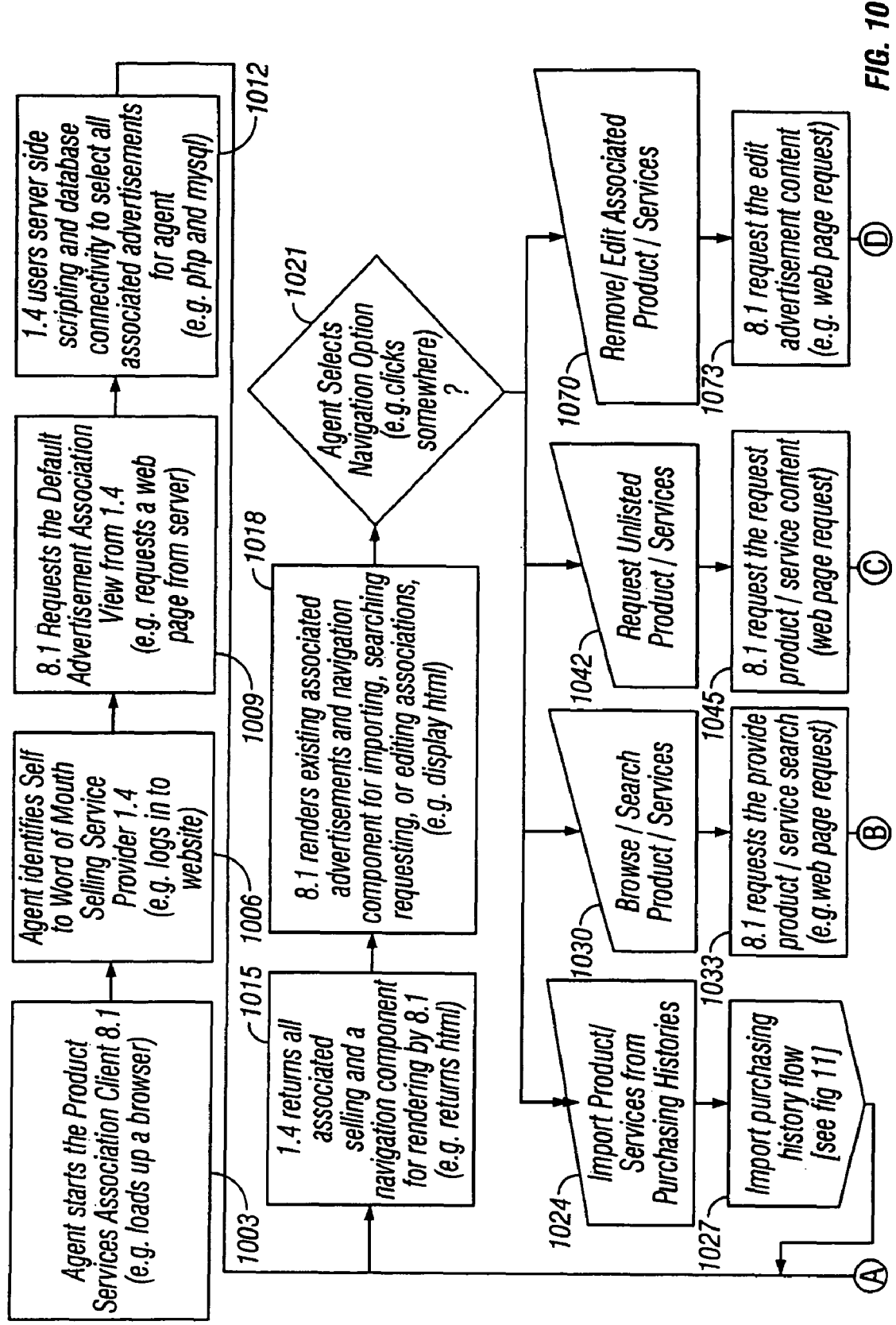
FIG. 10 is a flow chart showing the client-server interactions for the PSAS.
Figure 10:
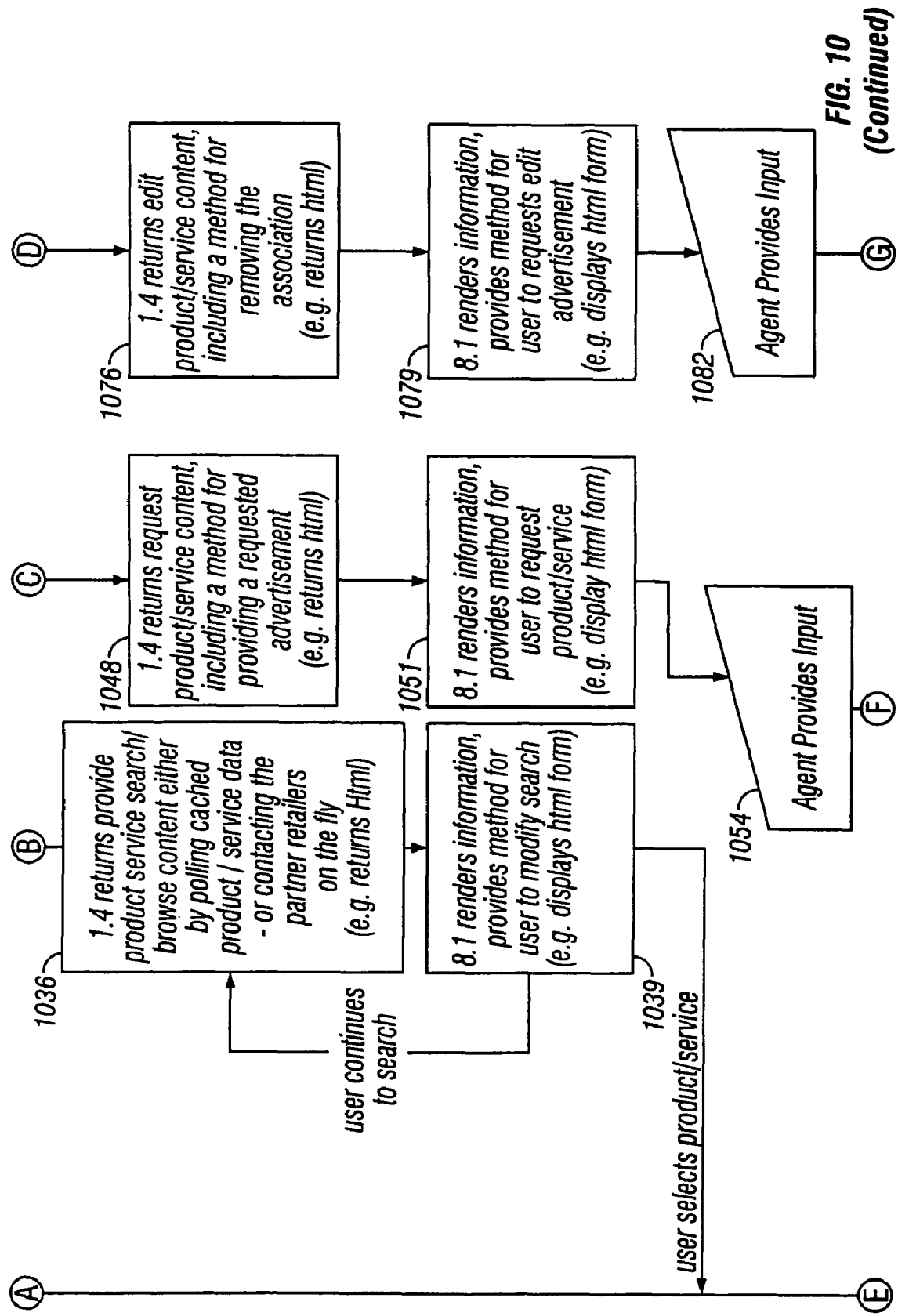
Figure 10:
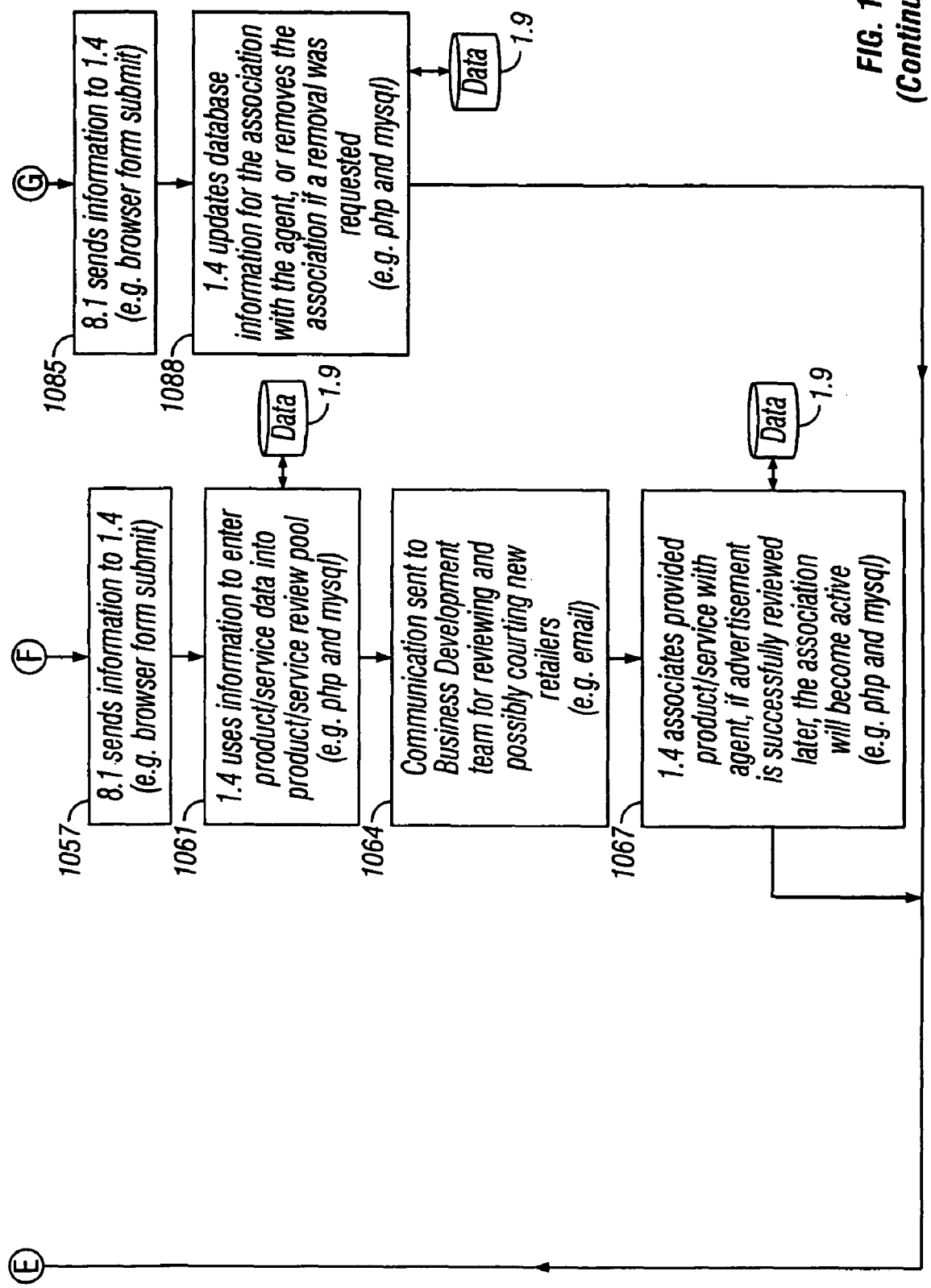

Referring to FIG. 10, there is a preferred example of flow of interaction between the APSAC 8.1, the agent 2.2, and the WMSSP 1.4, with reference numbers from 1003 through 1088 referring to the reference numbers in FIG. 10. The agent 2.2 begins the client, loading up a web browser (1003). The agent 2.2 then uses an authentication process, examples of which were provided in the preceding paragraph, to log into the WMSSP 1.4 (1006). After login, the WMSSP 1.4 calls upon PHP to process the script that returns the default page to the agent (1009), this page typically accesses the agent identifier in the Mysql database using a select SQL command to find the product/service identifiers that the agent is currently associated with (to the server as a reference point for the agent) (1012). Additional tables may then be referenced to find out more information about the products/services. The PHP script may also call upon a function that returns the HTML required for displaying a navigation menu that can be used by the user to access the various components of the PSASVCN 7.0. With this information, PHP 1.6 can finish creating the dynamically built HTML content and send this back to the APSAC 8.1 for rendering, as illustrated in the box identified with reference number (1015).

After the browser renders the content (1018) (as one example, APSAC 8.1 displays html or renders existing associated advertisements and navigation component for finding, providing, requesting, or editing associations), the agent may navigate the PSASVCN 7.0 options by clicking on an appropriate hyperlink (1021). One of these options is the import purchasing history option (1024) (also referred to with reference number 810), which is used to import purchasing histories (1027) from participating retailers for association.

Figure 11:
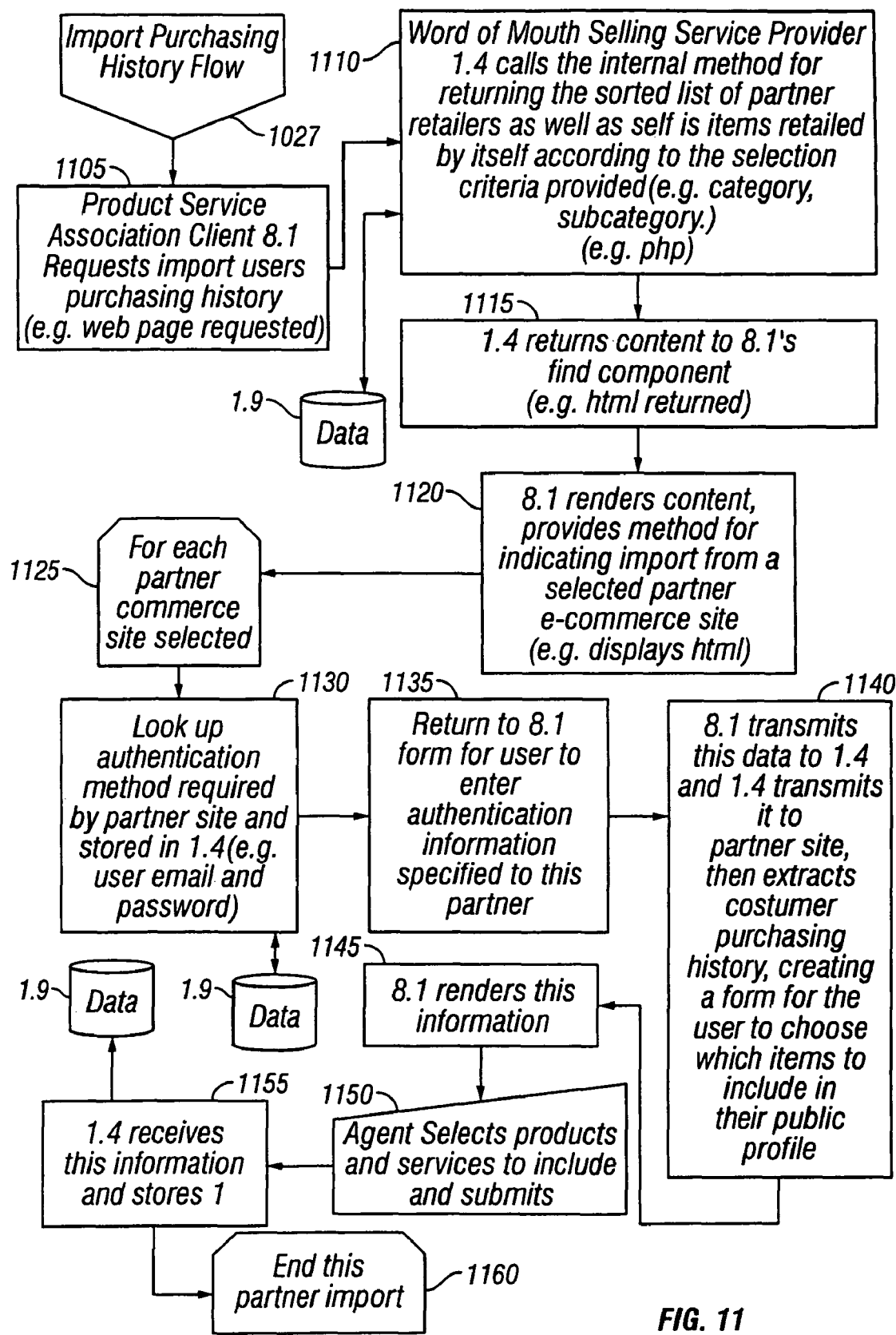
FIG. 11 is a flow chart showing the import component client-server interactions for the PSAS in more detail.

FIG. 11 describes the import PSASVCN 7.0 component (1024) in more detail. If the agent clicks on this option, the APSAC 8.1 sends a request to the WMSSP 1.4 for the importer default page (1105), received by the web server that directs the request to the PHP processing engine 1.6 and the appropriate script. The PHP script calls an internal function for determining the sorted list of available e-commerce partners according to the search criteria passed to the server (1110). In the case of the first access, there are no additional criteria. PHP 1.6 may also look up additional information regarding the products/services offered by the partners, such as their popularity, web links, image, identifiers, or the like by performing appropriate Select queries on the Mysql database 1.9. PHP 1.6 may also extract additional information from Mysql to garner the appropriate HTML for returning options (1115) supporting advanced searching and refined searching techniques. It should be appreciated that any search criteria passed onto the server can be used, or any combination thereof. Examples include single search key or multi-key searching, such as searching for people and their associated products or searching for people and their location, or products and associated locations etc. When the script is done processing, the dynamic output HTML has been created and the web server sends it back to the client, where it is rendered (1120).

At this point, the agent 2.2 may either perform more searching by refining the search or selecting advanced search, or they may decide to import their purchasing histories from one or more the retailers (i.e., choosing next action such as by clicking (1155)). If importing is selected (by checking appropriate checkboxes adjacent to the partner retailer), the client sends a request to the WMSSP 1.4 indicating this including the agent and the partner retailer identifiers. Upon receipt, PHP processes the request and initiate the flow for importing purchasing histories for each partner retailer requested by the agent. If the agent selects advanced searching options such as the restriction of the partners to a specific category and then submits the search, the client passes the criteria to the WMSSP 1.4, that has a new step that preprocess the set of available partners to match this criteria before performing the ranking.

For each partner commerce site that is selected (1125), the WMSSP 1.4 looks up an authentication method required by the partner site, such as in one example, in the Mysql database 1.9 (1130). Depending on the authentication method, it will dynamically output a form (1135) for the user 8.1 to enter the authentication information required by the partner e-commerce retailer, such as via a secure web site (SSL). If the user 8.1 already has imported items or the form references information that may have already been entered, the WMSSP 1.4 may pre-populate some fields in the form so the import process is more straightforward (such as same first name, last name for all partners). This is sent back to the client. When the user enters their authentication information and the client securely submits the information back to the WMSSP 1.4, the WMSSP 1.4 communicates over the Internet with the partner retailer (1140). In the preferred embodiment, the partner retailer has implemented a set of predefined web services defined by the WMSSP 1.4 that can be used to extract a particular user's purchasing history when given the authentication information. When this extraction occurs, the WMSSP 1.4 compares the purchasing history to any already reviewed purchasing history from that partner and the agent. For each item that has not already been considered, the WMSSP 1.4 dynamically creates HTML and a form that allows the user to include or hide this from the word of mouth selling profile. This is sent back to the client. The Agent selects the products and/or services to include in the Agent's profile (1150) and submits the form to the WMSSP 1.4. The WMSSP 1.4 receives the information and may store it in a database 1.9 (1155). The partner import may then be ended (1160).

Figure 9:
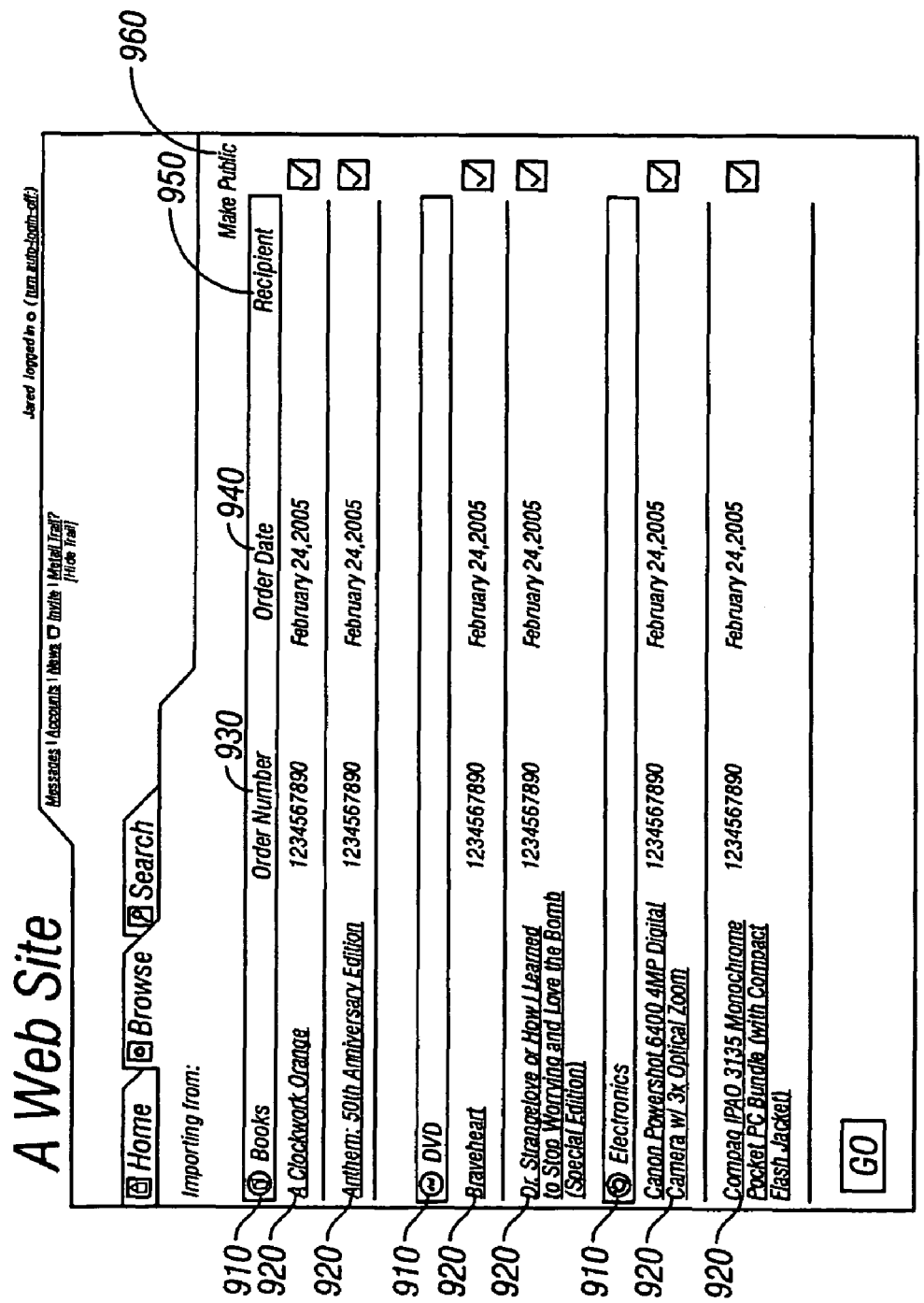
FIG. 9 is an illustration of an example product or service association client display.

FIG. 9 depicts an illustration of a sample imported purchasing history, where it is possible to see how the user can choose to incorporate each item in his or her profile within the WMSSP 1.4. After the client renders this form and the agent submits it back to the WMSSP 1.4, the WMSSP 1.4 stores the associated products and services in the mysql database, along with whether or not they are to be made public. Additional information regarding the time of access, partner retailer, etc. may also be stored. Next, the WMSSP 1.4 moves on to the next e-commerce partner or return HTML indicating the process has been completed to the client.

One or more categories (910) may be provided in which to display the products and services (920) purchased by the user. The categories (910) may include, for example, books, digital video discs (DVD), electronics, etc. Information (such as illustrated with reference numbers 930, 940, 950 and 960) regarding each purchase of the products and services (920) may be provided. For example, an order number 930, order date 940, recipient 950, and whether the purchase should be made public (960) may be provided. Additional information may also be provided.

In a preferred embodiment, the WMSSP 1.4 publishes a set of web service function interfaces that partner e-commerce retailers must be able to support in order to efficiently allow a user to import their purchasing history without custom development by the word of mouth selling service provider. In addition, the word of mouth selling service provider provides web service functions to partner retailers for accessing their account as well as allowing users to add items to their word of mouth selling profile upon checkout on the partner site as depicted in FIG. 13.

Figure 13:
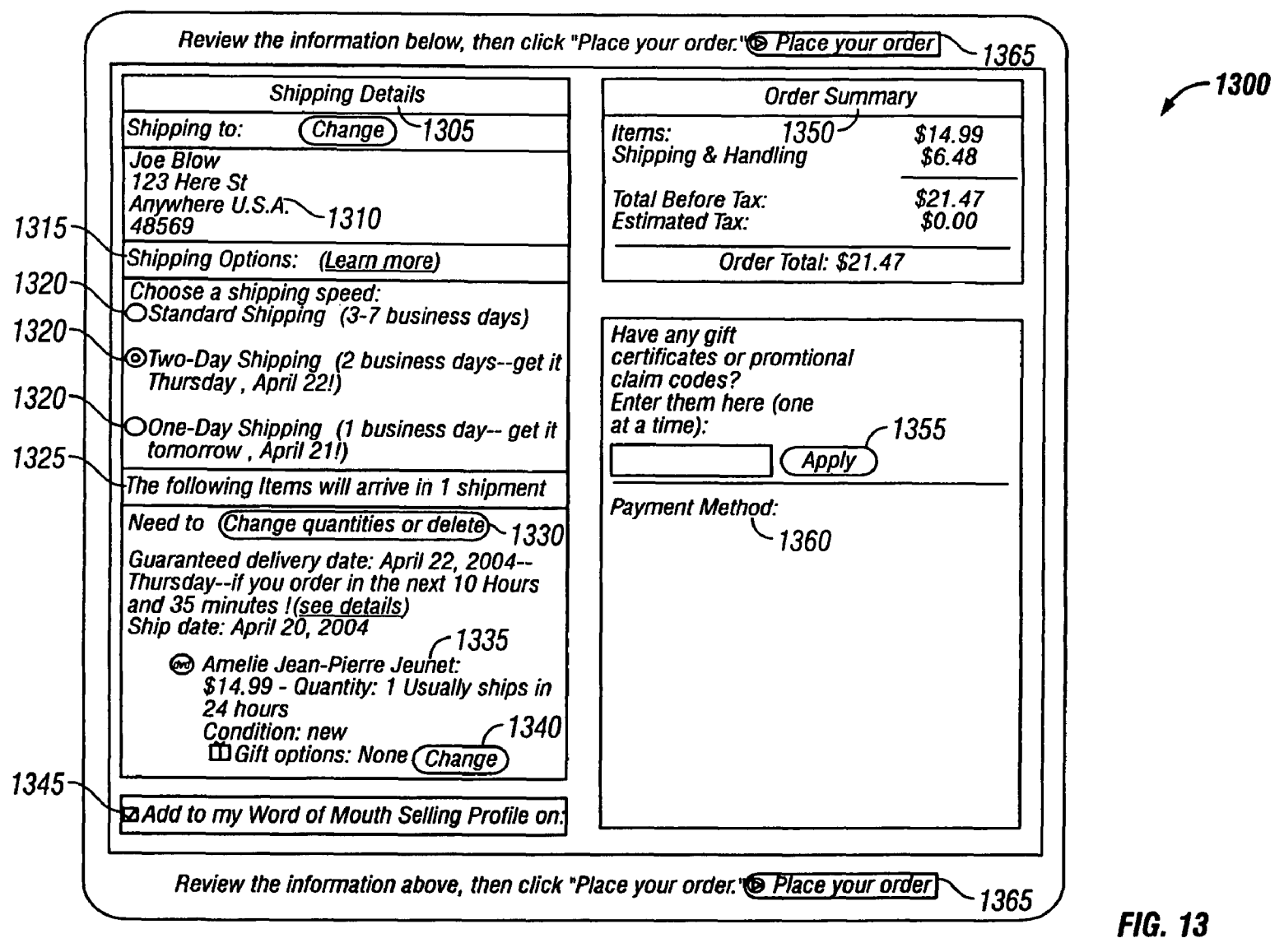

FIG. 13 illustrates an example viewer client display 1300 from a third party partner e-commerce site that demonstrates a way of allowing users to incorporate their purchasing histories to a word of mouth selling system according to one embodiment of the present invention. The display 1300 may include a shipping details section 1305 that provides various shipping information. The shipping details section 1305 may include a shipping to section 1310 that identifies a person or entity to which a product is being shipped.

A shipping options section 1315 that identifies one or more shipping speeds 1320 that a user may select for shipping the product. A number of shipments section 1325 may be provided to inform the purchaser regarding the number of shipments in which the product will arrive. A change/delete quantities selectable option 1330 may be provided that enables the user to change or delete quantities of products to be purchased. A purchase summary section 1335 may be provided that identifies a product recipient, product, shipping estimator, condition, gift options, etc. A change gift options selectable option 1340 may be provided to enable the purchaser to change gift options such as, for example, whether the product is to be gift wrapped. A profile option 1345 may be provided to enable the purchaser to add the purchase to his/her Word of Mouth Selling profile.

An order summary section 1350 may be provided that indicates a purchase price for the product(s), shipping and handling charges, a total before tax, estimated tax, and an order total. A claim code section 1355 may be provided to enable the purchaser to input a gift certificate or promotional claim codes for receiving a discount, rebate or other incentive for purchasing the product(s). A payment section 1360 may be provided to indicate a form of payment and corresponding payment information such as, for example, type of credit card, credit card number, credit card expiration date, etc. One or more place order selectable options 1365 may be provided to enable the purchaser to complete the purchase.

In addition to this type of import component, the WMSSP 1.4 may include a separate or integrated browse component that displays featured retailers as well as targeted advertisements, services for which advertisers and retailers may pay premiums in order to access a specific type or agent or more agents. The targeted component requires a separate system for retailers specifying target criteria about an agent that the WMSSP 1.4 can track.

Another option of the PSASVCN 7.0 is the ability to add desired products/services to an agent's profile in additional to their purchasing history. If the agent selects these options they can browse or search for available products/services in two ways. The first way involves having the client communicate with the WMSSP 1.4 and the WMSSP 1.4 communicating with the partner retailers in order to extract potential products/services for association and return dynamic html allowing the user to associate with the products/services as desired products. The second way involves the WMSSP 1.4 displaying products/services that it offers, has cached, or that users have already associated with, which involves querying the database but not querying the partner retailers.

Another option of the PSASVCN 7.0 is the ability for an agent to submit an unlisted product/service. If the agent selects this option, the client submits a request to the WMSSP 1.4 for the default HTML for the client to render, which typically includes empty form elements that the agent can use for providing or requesting a product/service or suggesting a partner retailer. After the client receives and renders this form, and after the agent fills out the form and submits it, the WMSSP 1.4 receives the form and processes it with PHP, creating a request for a new product/service or partner that is stored in the Mysql database and routed to the business development team for review before becoming incorporated into the WMSSP 1.4.

Another means for finding products/services that a user desires allows users to associate themselves with products/services as they are interacting with a WMSSVCN 1.0 and browsing other individuals or groups, so if a person is looking at their friend's associated products/services, they can associate with them on the fly, by clicking on an activator next to the product/service that automatically associates it with the viewer as a desired product.

The PSASVCN 7.0 also includes the ability to edit or remove an associated products/services. In this scenario, the agent would click on the product/service association that should be edited and the client would submit the advertisement identifier and the agent identifier to the server, where PHP would create the dynamic HTML content required for editing the association before sending the HTML back to the client for rendering. After the agent updated fields in the form and submitted the form back to the server, PHP of the WMSSP 1.4 would process the submitted form and interact with the Mysql database to update the association or remove it completely. A user might wish to make something private that was public, or vice versa, for example.

Another option of the PSASVCN 7.0 is the ability to browse/search products and services (illustrated with reference numbers 1030 and 820, and associated operations 1033, 1036 and 1039), which shares much of the functionality with the ability to request an unlisted product or service (illustrated with reference numbers 1042 and 830 and associated operations 1045, 1048 and 1051). If the agent selects either of these options, the client submits a request to the WMSSP 1.4 for the default HTML for the client to render (1033, 1045), which typically includes empty form elements that the agent can use for providing or requesting a product or service. After the client receives and renders this form (1036, 1039 or 1048, 1051), and after the agent fills out the form (i.e., provides input) and submits it (i.e., sends to the WMSSP 1.4) (1054, 1057), the WMSSP 1.4 receives the form and process it with PHP, creating a request for a new product or service such as by using the information provided to enter the product or service data into a product or service review pool (1061) that is stored in the Mysql database 1.9 and routed to the business development team for review and possibly courting a new retailer (1064) before becoming incorporated into the WMSSP 1.4 (1067) such as by associating the provided product or service with the specific retailer(s), and if the product or service is successfully reviewed later, the association becomes active.

The PSASVCN 7.0 also includes the ability to edit or remove an associated products and services (1070 and 850). In this scenario, the agent selects a product or service association that should be edited and the client submits the product or service identifier and the agent identifier to the server (i.e. requests to edit product or service content, 1073), where PHP would create the dynamic HTML content required for editing the association before sending the HTML back to the client for rendering (i.e., the WMSSP 1.4 returns edit product or service content, including an option for removing the association (1076)). The APSAC 8.1 renders information, provides a facility for the user to request editing of products or services, such as displaying an html form (1079). After the agent updates fields in the form and submits the form back to the server (i.e. agent provides input, (1082) and client 8.1 sends information to WMSSP 1.4, a browser form submit), PHP of the WMSSP 1.4 would process the submitted form and interact with the Mysql database to update the association or remove it completely (i.e., WMSSP 1.4 updates database information for the association with the agent, or removes the association if a removal was requested, (1088)).

Figure 12:
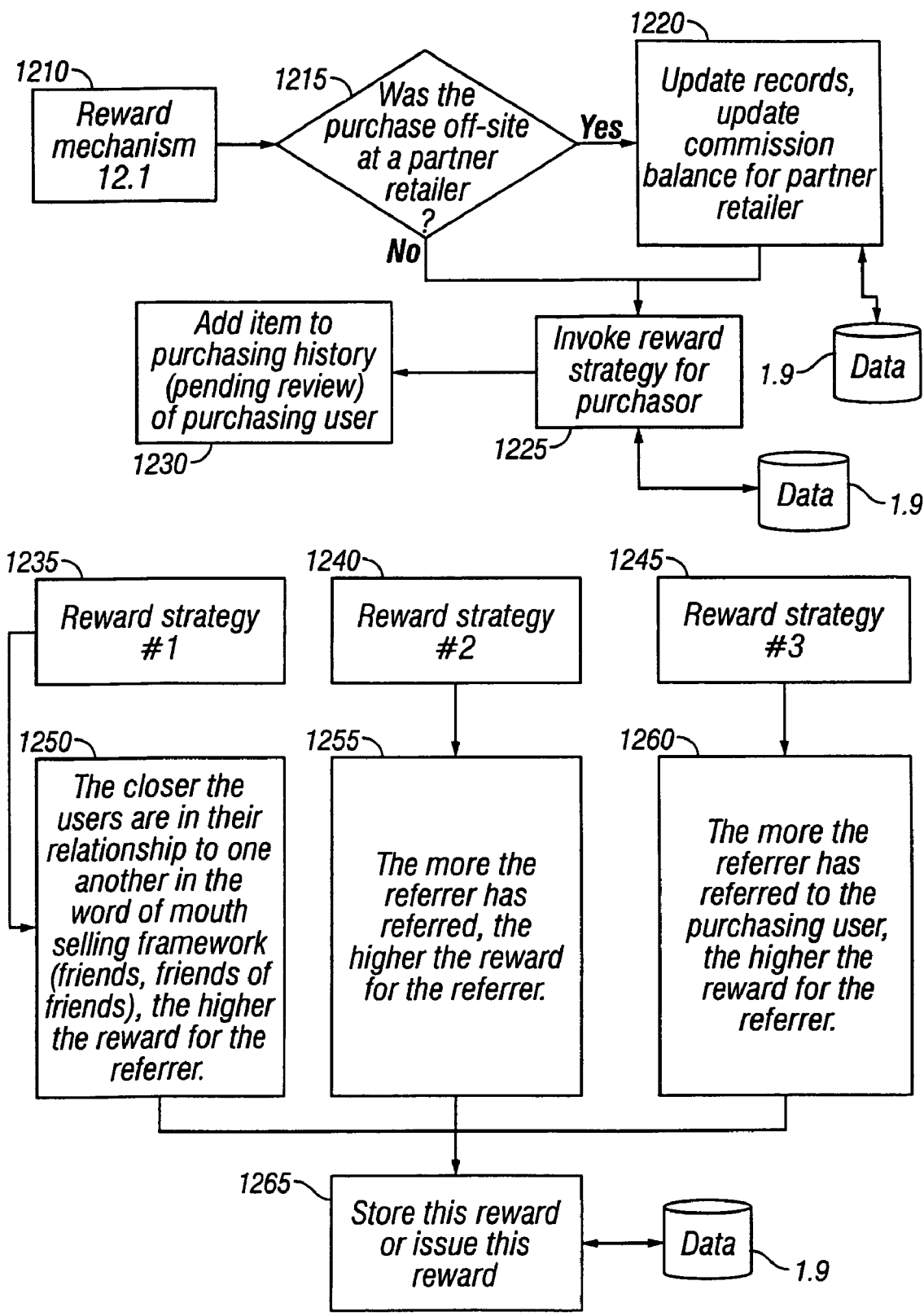
FIG. 12 is a flow chart that shows possible reward mechanisms and referral fees and who gets rewarded/paid.

Referring to FIG. 12, there is generally shown a high level flow by which agents 2.2 may be rewarded for referred purchases. In a preferred embodiment, users may only be rewarded for products they own so that the urge to take advantage of the system by being associated with as many products/services as possible is reduced. Although embodiments may exist where a user is not rewarded for referred business based on their previous purchases, and the act of aggregating, viewing, and sharing some of their purchasing is reward enough, a preferred embodiment provides incentives to attract more users to the system. This reward mechanism 1210 may be manually triggered when a successful sale is initiated because of the associated products/services of a user on the word of mouth selling system. It may also be triggered if the sale is completed on the word of mouth selling system. Alternatively, if the sale takes place on a third party system, the third party system may remember that a user was referred by the word of mouth selling framework and who they were referred from and then, if a purchase is subsequently made (that session, or within 30 days) the partner retailer can interact with the interface provided by the word of mouth selling system to record a successful transaction and trigger the reward mechanism. Finally, third party referral tracking software such as Linkshare® may be used to trigger the reward mechanism.

The reward mechanism 12.1 is triggered by passing some or all of the following information to the WMSSP 1.4: including the retailer, the referring agent-id, the purchasing agentid, the product purchased, the date purchased, the price purchased, etc. Additional information may be passed for bookkeeping (such as the retailer partner identification). At this point reward mechanism 12.1 may invoke a strategy for rewarding the user(s) who were involved in the transaction as well as updating the accounts for all participants, including relevant third party subscribers and partner e-commerce retailers. These strategies may include rewarding the referrer more for a closer relationship to the purchaser, rewarding the referrer more for more frequent referred sales, rewarding the referrer for frequent sales to this user. The rewards may be in the form of points that can be redeemed for coupons, gift certificates or the like. Rewards may also be in the form of cash rewards redeemable after a certain balance is met. Rewards also may be issued by the partner retailer and related to the products resold (i.e., an Ipod® sale referral may result in an Ipod® peripheral gift certificate).

Upon triggering the reward mechanism 1210, a determination may be made regarding whether the purchase was made at a partner retailer (described above) or at another location (1215). If the purchase was made at a partner retailer, records for the purchaser, referral, and partner retailer may be updated (1220). This may include updating the commission balance for the partner retailer. The updates may be stored in a database 1.9. If a determination is made that the purchase was not made at a partner retailer or after the records have been updated, a reward strategy for the purchaser may be invoked (1225). This may include accessing a database 1.9. The purchased item may be then be added to the purchaser's purchasing history (1230).

One or more reward strategies (1235, 1240, 1245) may be used to determine a referring party's reward. One reward strategy (1235) includes determining a reward based on a closeness of a relationship between the purchaser and the referring party (1250). For example, if the purchaser is a direct friend of the referring party, the reward may be higher. If the purchaser is a friend of a friend of a friend as provided for by the WMSS, the reward may be lower. A second reward strategy (1240) may be based on a number of referrals that the referring party has made (1255). The more referrals the referring party has made, the higher the reward for that referring party. A third reward strategy (1245) may be based on a number of referrals that the referring party has made to that purchaser (1260). The more referrals the referring party has made to that purchaser, the higher the reward for that referring party. Others types of reward strategies and combinations thereof may be used. After a reward strategy (1235, 1240, 1245) has been implemented, the reward may be stored by the WMSSP 1.4 in a database 1.9 and/or the reward may be issued to the referring party.

Many of the components described above may be operated independently and still be considered word of mouth selling systems via communication networks. The preferred system combines all of the elements described above.

Although the present invention has been described in terms of various embodiments, it is not intended that the invention be limited to these embodiments. Modification within the spirit of the invention will be apparent to those skilled in the art.

For example, the usage of the method and system to create an entertainment superstore that sold entertainment based on word of mouth and had participating e-commerce retailers such as Ticketmaster®, Apple® Itunes®, Amazon.com®, etc. and that rewarded users for purchases through them with complementary tickets, songs, or gift certificates, respectively, would be apparent to one skilled in the art.

Another example is using the word of mouth selling framework without the rewards mechanism delivered to the associated user on a third party social network, such as Friendster® subscribing to the word of mouth selling service and receiving a revenue share for all referrals and/or commissions from the partner retailers managed by the word of mouth selling service. Friendster® could allow a user to include their purchasing history but not reward them for referrals.

Thus, it is seen that a system and method of word of mouth selling via a communications network is provided. One skilled in the art will appreciate that the present invention can be practiced by other than the preferred embodiments which are presented in this description for purposes of illustration and not of limitation, and the present invention is limited only by the claims that follow. It is noted that equivalents for the particular embodiments discussed in this description may practice the invention as well.

What is claimed is:

1. A computer-implemented method of selling comprising:
    operating through a computer network an online community having members that include one or more agents each having a self-determined identity;
    having the one or more agents include self-determined content information as part of their self-determined identities, the self-determined identities being stored in a database system;
    having the one or more agents endorse product or service information in their identities in exchange for the possibility of a reward, the agent being rewarded upon the purchase of the product or service endorsed by another member of the online community;
    determining by one or more computers a degree of closeness of a relationship between the agent being rewarded and the other member of the online community, and determining a reward value based upon the determined degree of closeness;
    maintaining the database connected to the computer network and having a storage memory, the database associating the self-determined content information and product or service information with the respective one or more agents, the database containing searchable data relating to products or services;
    displaying via a display viewable by the member a viewable representation of the product or service information data by:
    receiving a view request from the computer network to view a selected agent's self-determined content information;
    assembling data corresponding to said selected agent's content information, including in said content information associated product or service information, including product or service display data;
    sending a product/service request via the computer network for the associated product or service information data, including contacting external retail services to get up-to-date retailer information about the product or service, the request sent from a content service provider to a word of mouth selling service provider;
    selecting via a selection device the products or services requested by the product/service request and merging the products or services with the content information;
    sending a product or service selection signal including data from the computer network indicating that the member of the online community who sent the view request wants to purchase one or more of the products or services; and directing the member of the online community to one of said associated selling service providers to purchase the one or more products or services indicated by the product or service selection signal.

2. The method of claim 1 further comprising receiving said request for a second of said agents' associated information via the computer network prior to providing said content information via the computer network.

3. The method of claim 1 wherein said online community includes a plurality of associated selling service providers, and said content information includes information concerning products or services available for purchase via the computer network from the one or more associated selling service providers.

4. The method of claim 1 further comprising invoking a reward mechanism via the computer network.

5. The method of claim 4 wherein said invoking a reward mechanism via the computer network includes associating a reward with said one or more agents whose self-determined identities are viewable via the computer network.

6. The method of claim 4 wherein said invoking a reward mechanism via the computer network includes associating a reward with one or more viewers participating in the online community via the computer network.

7. The method of claim 1 wherein the reward is selected from one or more of the items in the following group: money, a discount, a gift certificate, a reward point program.

8. The method of claim 1, further comprising modifying said self-determined content information in said database in accordance with instruction operations by said respective one or more agents.

9. A computer-implemented method of selling comprising:
accessing an online community via a computing system having an input, a display, a storage memory and a selection device, the online community having members that include one or more agents each having a respective self-determined identity, the respective self-determined identity including data stored in the storage memory,
wherein at least some of the data corresponds to at least one product or service that is endorsed by the one or more agents and associated with at least one respective selling service provider; and
wherein the data corresponding to the product or service is included in the self-determined identity in exchange for the possibility of a reward, the agent being rewarded upon the purchase of the product or service by another member of the online community;
determining by one or more computers a degree of closeness of a relationship between the agent being rewarded and the other member of the online community, and determining a reward value based upon the determined degree of closeness;
providing the data of at least one self-determined identity of at least one of said agents for viewing by the members of the online community, the data being viewable via the display to obtain word of mouth referrals of products or services by:
receiving a view request from the computing system to view a selected agent's self-determined identity;
displaying via the display the data corresponding to the at least one product or service included in the self-determined identity of the selected agent;
sending a product or service selection signal from the computing system to a selling service system, including contacting external retail servers to get up-to-date retailer information about the product or service, the selection signal indicating that the member of the online community who sent the view request wants to purchase one or more of the at least one product or service included in the self-determined identity of the selected agent;
selecting at least one of said product or service for purchase or viewing from its respective selling service provider; and
displaying via the display a list of products or services requested by the product or service selection signal to the member of the online community who sent the view request; and
directing the member of the online community to one or more associated selling service providers to purchase the one or more products or services indicated by the product or service selection signal and merging the products or services with the data in the respective self-determined identity;
wherein the product or service has not been previously purchased by the agent.

10. The method of claim 9 further comprising viewing via the computing system information concerning said selected at least one product or service from the respective selling service provider.

11. The method of claim 9 further comprising purchasing via the computing system said at least one product or service from said respective selling service provider.

12. The method of claim 11 further comprising associating a reward with said agent via the computing system following said purchasing.

13. The method of claim 9, wherein the reward is provided by the selling service provider.

14. A computing system of selling within an online community comprising:
a computer-readable identity module providing a self-determined identity of one or more members of said online community, each member's self-determined identity comprising:
self-determined content information; and
product or service information endorsed by the member, wherein upon purchase of the product or service information by another member of the online community, the member receives a reward, wherein one or more computers determine a degree of closeness of a relationship between the agent being rewarded and the other member of the online community, and a reward value is determined based upon the determined degree of closeness;
a computer-readable content information association module by which the self-determined content information and the product or service information is associated with the respective identity of said one or more member, each said one or more member having associated content information and product or service information being designated an agent, wherein the agent associates the product or service information with the agent's self-determined identity in exchange for a reward;
a computer-based database containing said content information and said product or service information associated with said respective identities of said one or more agents, said database being searchable to obtain word of mouth referrals of products or services;
a computer-readable data access module adapted to access said database and provide said content information and said associated product or service information to a requesting member in response to a request for said content information associated with at least one of said respective identities; and a purchase facilitator module that assists a requesting member in purchasing a product or service by directing the requesting member to an associated selling service provider in response to a request to purchase one or more of the associated products or services, including contacting one or more external retail data servers to get up-to-date product or service information and merging the products or services with the data in the self-determined content information;

wherein the product or service information associated with the agent's self-determined identity are products and services that the agent has not purchased.

15. The system of claim 14 further comprising a means for receiving said request for an agent's associated information prior to providing said content information.

16. The system of claim 15 further comprising means for receiving a product or service selection signal.

17. The system of claim 14 further comprising means of providing for rewarding agents and/or viewers for purchases.

18. The method of claim 14, wherein the reward is provided upon the viewing the product or service associated with the agent's self-determined identity or purchasing the product or service associated with the agent's self-determined identity.

19. The method of claim 18, wherein the reward comprises money, products, services, discounts, gift certificates, or a points towards cash, products, services, discounts, or gift certificates.

20. A system of online referral based selling comprising:
a computer-readable user information module adapted to provide information identifying individuals or groups of individuals of an online community and their associated content to a requesting member of the online community;

a database module organizing content relating to the individuals or groups of individuals, said content including identities associated with self-determined product or service information and said data being associated with each identity in exchange for a reward, the database module further containing product or service information endorsed by the member, wherein upon purchase of the product or service information by another member of the online community the member receives a reward, wherein one or more computers determine a degree of closeness of a relationship between the agent being rewarded and the other member of the online community, and a reward value is determined based upon the determined degree of closeness, the database module being searchable to obtain word of mouth referrals of products or services;

a computer accessible view request module adapted to receiving requests from members of the online community to view an individual's associated content;

a computer accessible data access module adapted to access said database and provide said content information and said associated product or service information to a requesting member in response to a request for said selected individual's associated content; and a computer-readable information receipt module adapted to receiving information requests for product or service information based on the self-determined product or service information correlated with a particular individual or group of individuals in the database module, the computer-readable information receipt module further providing the product or service information, including information regarding associated selling service providers, including contacting external web services to get up-to-date retailer information about the product or service, to a requester of the product or service information and merging the products or services with the data in the respective associated content;

wherein said data associated with each identity are products and services that have not been purchased by the individual or group.

* * * * *